(12) United States Patent
Alanqar et al.

(10) Patent No.: US 11,933,513 B2
(45) Date of Patent: Mar. 19, 2024

(54) BUILDING CONTROL SYSTEM WITH SETPOINT INJECTION FOR ONLINE SYSTEM IDENTIFICATION

(71) Applicant: Johnson Controls Tyco IP Holdings LLP, Milwaukee, WI (US)

(72) Inventors: Anas W. I. Alanqar, Milwaukee, WI (US); Michael J. Wenzel, Grafton, WI (US); Mohammad N. Elbsat, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 136 days.

(21) Appl. No.: 17/390,225

(22) Filed: Jul. 30, 2021

(65) Prior Publication Data

US 2023/0048341 A1 Feb. 16, 2023

(51) Int. Cl.
*F24F 11/61* (2018.01)
*F24F 11/63* (2018.01)
*G06N 3/08* (2023.01)

(52) U.S. Cl.
CPC ............ *F24F 11/61* (2018.01); *F24F 11/63* (2018.01); *G06N 3/08* (2013.01)

(58) Field of Classification Search
CPC .. F24F 11/61; F24F 11/63; F24F 11/30; F24F 11/46; F24F 11/006; G06N 3/08; G05B 15/02
See application file for complete search history.

(56) References Cited

U.S. PATENT DOCUMENTS

| 9,235,657 | B1 | 1/2016 | Wenzel et al. |
| 9,447,985 | B2 | 9/2016 | Johnson |
| 10,208,974 | B2 * | 2/2019 | Merrill .................... G05B 15/02 |
| 10,816,973 | B2 * | 10/2020 | Jiang ..................... B60W 30/00 |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Haniff, M.F., Selamat, H., Yusof, R., Buyamin, S. and Ismail, F.S., 2013. Review of HVAC scheduling techniques for buildings towards energy-efficient and cost-effective operations. Renewable and Sustainable Energy Reviews, 27, pp. 94-103. (Year: 2013).*

(Continued)

*Primary Examiner* — Alicia M. Choi
(74) *Attorney, Agent, or Firm* — Foley & Lardner LLP

(57) ABSTRACT

A method includes obtaining an optimized setpoint schedule for a time period, identifying a pre-cooling or pre-heating segment of the time period of the optimized setpoint schedule, adjusting the optimized setpoint schedule based on a characteristic of the pre-cooling or pre-heating segment to obtain an adjusted setpoint schedule, and operating the building equipment in accordance with the adjusted setpoint schedule.

24 Claims, 20 Drawing Sheets

(56) References Cited

U.S. PATENT DOCUMENTS

| | | | | |
|---|---|---|---|---|
| 11,525,594 | B1* | 12/2022 | Hinson | F24F 11/64 |
| 2003/0055798 | A1 | 3/2003 | Hittle et al. | |
| 2007/0227721 | A1* | 10/2007 | Springer | F24F 11/62 165/291 |
| 2010/0070091 | A1* | 3/2010 | Watson | G06Q 50/06 700/278 |
| 2012/0296480 | A1* | 11/2012 | Raman | G05D 23/1934 700/277 |
| 2015/0219356 | A1* | 8/2015 | Ito | G05D 23/1904 165/266 |
| 2016/0124411 | A1* | 5/2016 | Tinnakornsrisuphap | H02J 3/008 700/291 |
| 2017/0198932 | A1* | 7/2017 | Sato | F24F 11/48 |
| 2018/0017275 | A1* | 1/2018 | Merrill | F24F 11/62 |
| 2018/0299152 | A1* | 10/2018 | Libal | H04W 4/021 |
| 2018/0306459 | A1* | 10/2018 | Turney | G05B 13/048 |
| 2019/0038978 | A1* | 2/2019 | Rider | A63F 13/92 |
| 2019/0257544 | A1 | 8/2019 | Alanqar et al. | |
| 2019/0316802 | A1 | 10/2019 | Alanqar et al. | |
| 2020/0041158 | A1 | 2/2020 | Turney et al. | |
| 2020/0100394 | A1* | 3/2020 | Albinger | G06F 30/20 |
| 2020/0218208 | A1 | 7/2020 | Alanqar et al. | |
| 2020/0218991 | A1 | 7/2020 | Alanqar et al. | |
| 2021/0018198 | A1 | 1/2021 | Alanqar et al. | |
| 2021/0018205 | A1 | 1/2021 | Ellis et al. | |
| 2021/0018209 | A1 | 1/2021 | Ellis et al. | |
| 2021/0199329 | A9* | 7/2021 | Mowris | F24F 8/22 |
| 2021/0285671 | A1 | 9/2021 | Du et al. | |
| 2022/0215487 | A1* | 7/2022 | Matsuoka | F24F 11/62 |
| 2023/0048341 | A1* | 2/2023 | Alanqar | G06N 3/09 |
| 2023/0235951 | A1* | 7/2023 | Woolf | F25D 13/00 700/115 |
| 2023/0315135 | A1* | 10/2023 | Reeder | G05D 23/1923 700/300 |

FOREIGN PATENT DOCUMENTS

| | | | |
|---|---|---|---|
| EP | 1 156 286 A2 | | 11/2001 |
| EP | 3 186 687 A4 | | 7/2017 |
| EP | 3 497 377 A1 | | 6/2019 |
| WO | WO-2012/161804 A1 | | 11/2012 |
| WO | WO-2013/130956 A1 | | 9/2013 |
| WO | WO-2022265862 A1 * | 12/2022 | F24F 11/47 |

OTHER PUBLICATIONS

Yang, I.H., 2010. Development of an artificial neural network model to predict the optimal pre-cooling time in office buildings. Journal of Asian Architecture and Building Engineering, 9(2), pp. 539-546. (Year: 2010).*

Xu, P., 2006. Peak demand reduction from pre-cooling with zone temperature reset in an office building. (Year: 2006).*

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "Jla Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

(56) References Cited

OTHER PUBLICATIONS

Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems—A Review," 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

\* cited by examiner

BUILDING CONTROL SYSTEM WITH SETPOINT INJECTION FOR ONLINE SYSTEM IDENTIFICATION

BACKGROUND

The present disclosure relates generally to control systems for buildings. The present disclosure relates more particularly to controlling building equipment to generate accurate models through system identification.

System identification refers to a determination of a model that describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model. The predictive model therefore reflects the system dynamics represented in the measured and recorded data. However, under normal operations, systems dynamics may not contain sufficient excitations or other behaviors to provide sufficient operational data for high quality model identification.

SUMMARY

One implementation of the present disclosure is a method of operating building equipment. The method includes obtaining an optimized setpoint schedule for a time period, identifying a pre-cooling or pre-heating segment of the time period of the optimized setpoint schedule, adjusting the optimized setpoint schedule based on a characteristic of the pre-cooling or pre-heating segment to obtain an adjusted setpoint schedule, and operating the building equipment in accordance with the adjusted setpoint schedule.

In some embodiments, the method also includes collecting data relating to the building during the operating the building equipment in accordance with the adjusted setpoint schedule and generating a system model based on the data collected during the operating the building equipment in accordance with the adjusted setpoint schedule. Adjusting the optimized setpoint schedule causes an improvement in a quality of the data collected during the operating the building equipment in accordance with the adjusted setpoint schedule relative to operating the building equipment in accordance with the optimized setpoint schedule.

In some embodiments, the method also includes obtaining a comfort threshold for a space served by the building equipment, the comfort threshold defining at least one of a minimum comfortable value for the space or a maximum comfortable value for the space and setting one or more setpoints of the adjusted setpoint schedule to the minimum comfortable value for the space or the maximum comfortable value for the space.

In some embodiments, obtaining the comfort threshold includes generating the comfort threshold using a neural network. In some embodiments, the characteristic is a duration of the pre-cooling or pre-heating segment and adjusting the optimized setpoint schedule includes extending the pre-cooling or pre-heating segment if the duration is less than a threshold value. Extending the pre-cooling or pre-heating segment includes starting the pre-cooling or pre-heating segment at an earlier time in the time period while maintaining an end time of the pre-cooling or pre-heating segment.

In some embodiments adjusting the optimized setpoint schedule includes adding (injecting) an additional pre-cooling or pre-heating segment such that the additional pre-cooling or pre-heating segment ends at an end of an ON period for the building equipment. In some embodiments, the method also includes collecting data during the operating the building equipment, performing a quality assessment of the data, and in response to the data failing the quality assessment, skipping the adjusting the optimized setpoint schedule for a subsequent time period. In some embodiments, the characteristic is a duration of the pre-cooling or pre-heating segment. In some embodiments, the characteristic is a total count of one or more charge periods including the pre-cooling or pre-heating segment.

Another implementation of the present disclosure is a building control system including circuitry. The circuitry is configured to obtain an optimized setpoint schedule for a time period, identify a pre-cooling or pre-heating segment of the time period of the optimized setpoint schedule, adjust the optimized setpoint schedule based on a characteristic of the pre-cooling or pre-heating segment to obtain an adjusted setpoint schedule, and operate building equipment in accordance with the adjusted setpoint schedule.

In some embodiments, the circuitry is further configured to collect data relating to the building during the operating the building equipment in accordance with the adjusted setpoint schedule and generate a system model based on the data collected during the operating the building equipment in accordance with the adjusted setpoint schedule. Adjusting the optimized setpoint schedule causes an improvement in a quality of the data collected during the operating the building equipment in accordance with the adjusted setpoint schedule relative to operating the building equipment in accordance with the optimized setpoint schedule.

In some embodiments, the circuitry is further configured to obtain a comfort threshold for a space served by the building equipment; and prevent the adjusted setpoint schedule from violating the comfort threshold. The circuitry may obtain the comfort threshold by generating the comfort threshold using a neural network.

In some embodiments, the characteristic is a duration of the pre-cooling or pre-heating segment and the circuitry is configured to adjust the optimized setpoint schedule by extending the pre-cooling or pre-heating segment if the duration is less than a threshold value. In some embodiments, extending the pre-cooling or pre-heating segment includes starting the pre-cooling or pre-heating segment at an earlier time in the time period while maintaining an end time of the pre-cooling or pre-heating segment.

In some embodiments, the circuitry is further configured to obtain a limit on a variable represented in the optimized setpoint schedule and the adjusted setpoint schedule. The circuitry is configured to adjust the optimized setpoint schedule by moving values of the variable for the pre-cooling or pre-heating segment to the limit.

In some embodiments, the circuitry is configured to adjust the optimized setpoint schedule by adding an additional pre-cooling or pre-heating segment such that the additional pre-cooling or pre-heating segment ends at an end of an ON period for the building equipment.

In some embodiments, the circuitry is further configured to collect data during the operating the building equipment, perform a quality assessment of the data, and in response to the data failing the quality assessment, skip an adjustment of the optimized setpoint schedule for a subsequent time period. In some embodiments, the characteristics is a duration of the pre-cooling or pre-heating segment. In some embodiments, the characteristic is a total count of one or more charge periods including the pre-cooling or pre-heating segment.

Another implementation of the present disclosure is a method of operating building equipment. The method includes obtaining a setpoint schedule for a time period, increasing a quality of data created over the time period by injecting an additional setpoint change into the setpoint schedule based on a characteristic of the setpoint schedule, where injecting the additional setpoint change causes an increase is system excitation, and operating building equipment based on the setpoint schedule and the additional setpoint change. The method may include identifying a system model using the data, Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
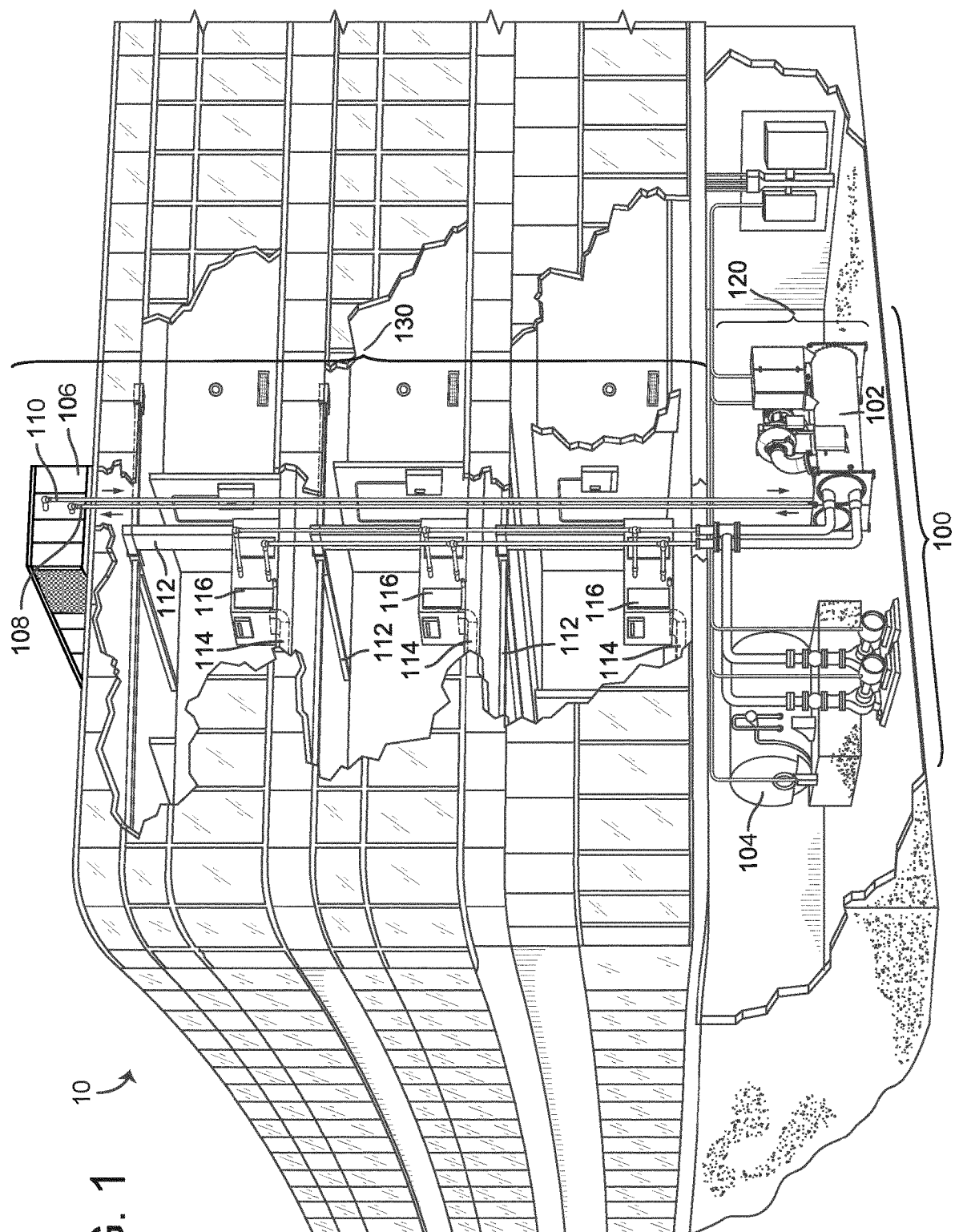
FIG. 1 is a drawing of a building equipped with a HVAC system, according to some embodiments.

Referring generally to the FIGURES, systems and methods for automatic training data selection for use in online system identification is shown, according to an exemplary embodiment. The accuracy of a predictive model identified through a system identification process (for example using the systems and methods described herein) is reliant on how well the training data represents the true system dynamics. The features of the present application include a determination that the quality of the training data can be assessed in terms of several characteristics.

First, the training data must represent scenarios in which the HVAC system is well-controlled. That is, the HVAC system should be actively operating to (successfully) control indoor air temperature. For example, actuator saturation, referring to a situation in which the HVAC system (and/or HVAC equipment therein) is providing a maximum or a minimum value of heat transfer $\dot{Q}_{HVAC}$ without tracking a temperature setpoint, such that the system is not well-controlled. Actuator saturation can jeopardize the quality of the data. Other scenarios may occur which cause the HVAC system to be unable to control the actual/measured temperature to track a temperature setpoint. Using such data can result in unreliable models. Accordingly, sufficient correlation between temperature setpoints and measured temperatures is one criterion that can be used to assess quality of training data for use in system identification.

Second, the data used for system identification must be under a sufficient heating or cooling load. Low load results in the HVAC working in "off" or economy mode, since not much heat is needed to be provided or removed. This situation can happen in shoulder seasons (e.g., spring, fall) where outdoor air temperature is close to comfortable indoor air temperatures. The result of low load periods is data that does not contain sufficient excitations of the system and therefore do not reflect a sufficient range of thermal dynamics to train an accurate building model. Accordingly, assessing the amount of time spent in at a low load can provide a second criterion that can be used to assess the quality of training data for use in system identification.

Third, the data used for system identification must include a proper amount of HVAC system excitations. When a system is in good control and is under enough heating or cooling loads, excitations result from setpoint changes with sufficient frequencies. Low-frequency setpoint excitation (i.e., long durations between setpoint changes, no or few setpoint changes) may result constant states that do not show sufficient dynamics for training a model. In such scenarios, data must be used over a very long time span to collect enough setpoint changes for model training, and the data may then primarily reflect slower-moving dynamics of the system. Also, very high frequency setpoint excitations (i.e., short durations between setpoint changes, many setpoint changes) are also not favored in training data as they do not allow the building and the HVAC system enough time to respond to the setpoint change. Additional, high-frequency excitations may be difficult to distinguish from sensor noise or other disturbances which may have a similar frequency. Therefore, an assessment of whether a set of training data includes sufficient excitations in a preferred range between extreme low-frequency and extreme high-frequency is a third criterion that can be used to assess the quality of training data for use in system identification.

As described in detail below, an approach can be implemented to automatically perform the assessments to determine whether sets of training data meet these multiple criteria (e.g., three, four) for setpoint-to-measured temperature correlation, sufficiently high loads, and sufficient proper-frequency excitations. By automatically assessing sets of possible training data and then selecting some of those sets to be used in system identification based on results of the assessments, the use of high quality of training data can be automatically ensured. Improved models can be achieved as a result.

Furthermore, in some cases, performing automatic data selection can enable training data to be collected during online operation of a building management system and HVAC system (e.g., during normal operations while the building is occupied). For example, in alternative embodiments or in cases where insufficient quality data is obtained, an experiment can be performed by controlling the HVAC system to explore a wide range of system dynamics. Such experiments may include creating discomfort by occupants by heating or cooling the building beyond a comfortable level. The systems and methods of automatic data selection for system identification described herein may allow for data to be collected without such disruptive experiments by allowing data to be collected while the building is occupied over various weather conditions and temperature setpoint changes (e.g., user-requested setpoint changes, setpoint changes provided by a model predictive controller) and then automatically selecting a subset of the data that will result in an accurate system model. Data that would result in a less-accurate model can be discarded. Accordingly, the disclosure herein enables automated online system identification, which may be particularly useful for retrofitting buildings with a model-based controller, periodically updating a system model, and/or capturing dynamics that may be affected by human activity in the building. These and other features and advantages are described in detail below.

To elaborate on experiments that can be performed to help generate higher quality data for system identification (e.g., data that results in a model that makes more accurate predictions) in some embodiments such experiments are performed by generating setpoints using a pseudo random binary sequence (PRBS) to cause more system excitations that may occur under normal situations. However, due to the random nature of such experiments, controlling building equipment in this manner may cause discomfort for occupants (too hot, too cold, etc.) as well as incurring relatively high utility costs due to high energy requirements needed to quickly respond to randomly changing temperature setpoints and a lack of consideration of time-of-use energy pricing. This application describes (primarily with respect to the passages starting with FIG. 10A below) an alternative approach which modifies setpoints to improve data quality while still considering occupant comfort and energy cost considerations. Other considerations such as carbon emissions reductions can also be considered. The system and methods described herein thus advantageously allow for online experiments that can be run during normal building operations to generate robust data for system identification without compromising user comfort and without incurring energy costs significantly higher than normal building operations.

Building HVAC Systems

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid.

The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
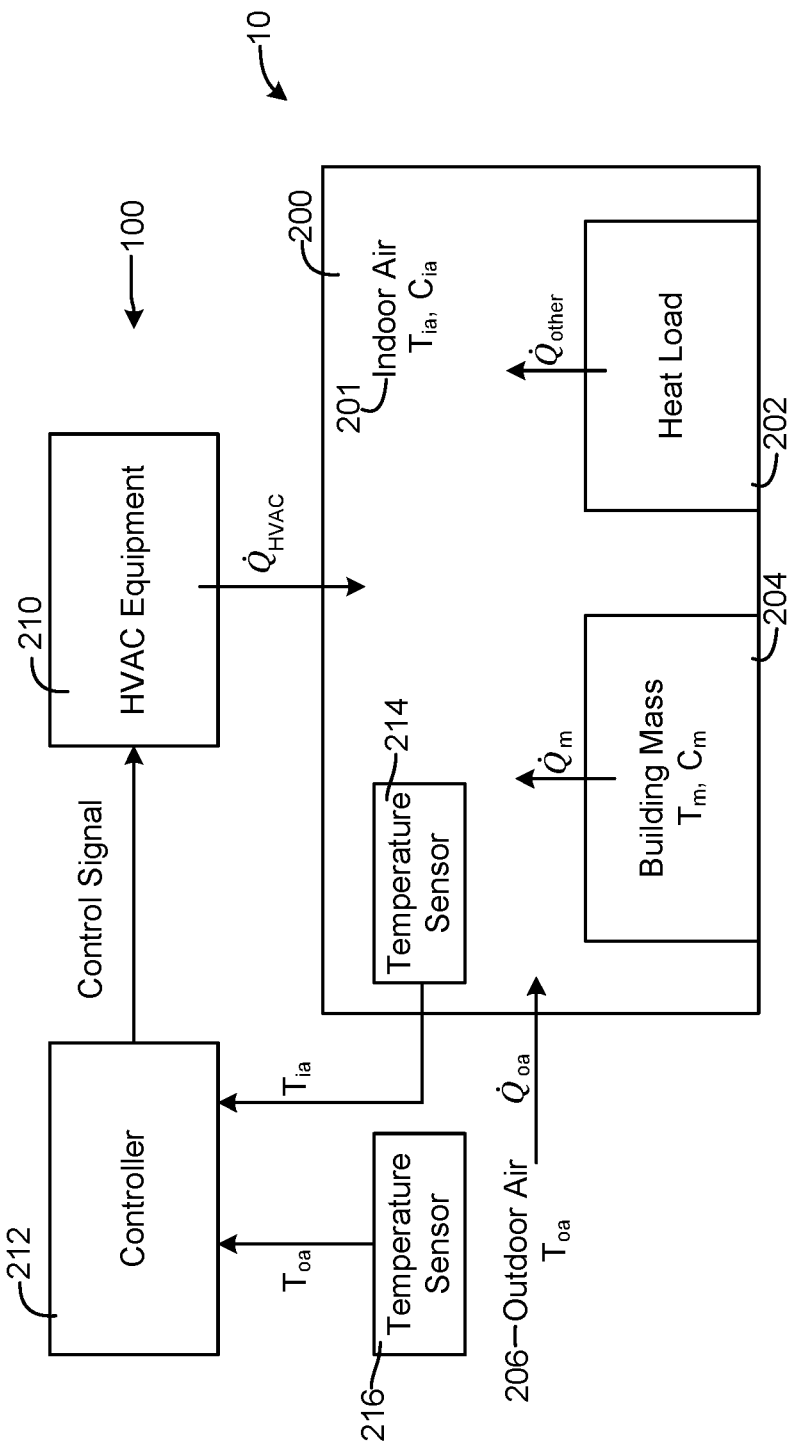
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance $C_{ia}$. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$, to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(S)ds \qquad \text{(Eq. A)}$$

$$\varepsilon_{sp} = T_{sp,j} - T_{ia} \qquad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
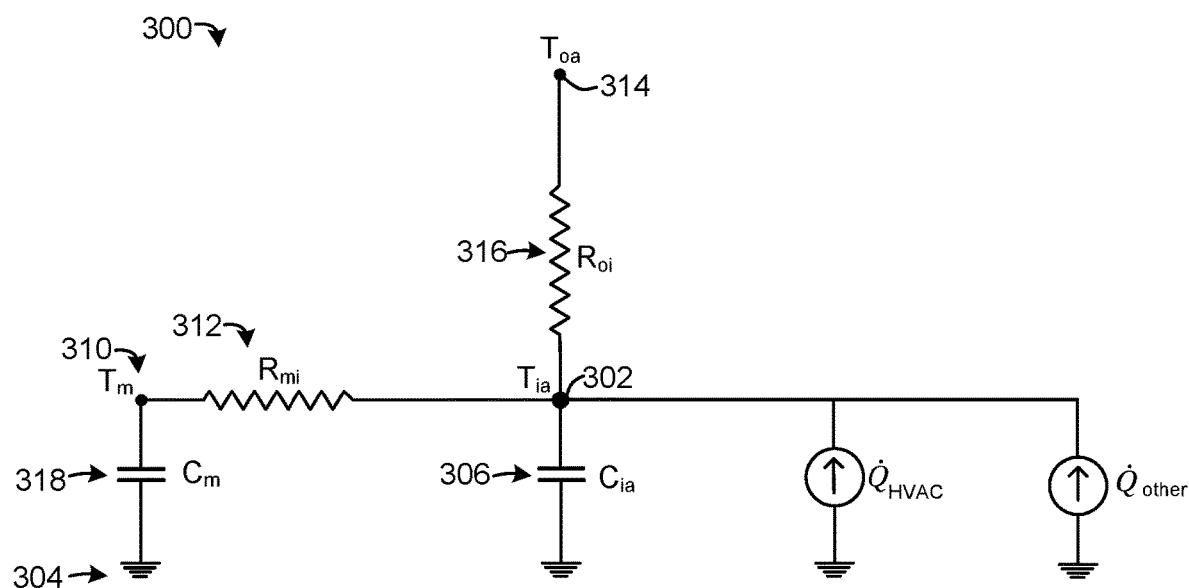
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers $\dot{Q}$ of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \quad \text{(Eq. C)}$$

$$C_m\dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \quad \text{(Eq. E)}$$

$$\begin{bmatrix} T_{ia} \\ T_m \\ I \end{bmatrix} + \begin{bmatrix} -\frac{K_{p,j}}{C_{ia}} & \frac{1}{C_{ia}R_{oi}} \\ 0 & 0 \\ 1 & 0 \end{bmatrix}\begin{bmatrix} T_{sp,j} \\ T_{oa} \end{bmatrix} + \begin{bmatrix} \frac{1}{C_{ia}} \\ 0 \\ 0 \end{bmatrix}\dot{Q}_{other};$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix}\begin{bmatrix} T_{ia} \\ T_m \\ I \end{bmatrix} + \begin{bmatrix} 0 & 0 \\ K_{p,j} & 0 \end{bmatrix}\begin{bmatrix} T_{sp,j} \\ T_{oa} \end{bmatrix}; \quad \text{(Eq. F)}$$

where I represents the integral term $\int_0^t \varepsilon_{sp}(s)$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

where

-continued $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix}, B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix}, D_c(\theta) = \begin{bmatrix} 0 & 0 \\ \theta_4 & 0 \end{bmatrix};$$

$$\theta_1 = \frac{1}{C_{ia}R_{oi}}; \theta_2 = \frac{1}{C_{ia}R_{mi}}; \theta_3 = \frac{1}{C_{ia}};$$

$$\theta_4 = K_p; \theta_5 = \frac{1}{\tau}; \theta_6 = \frac{1}{C_m R_{mi}}; \text{ and }$$

$$\dot{x}(t) = \begin{bmatrix} \dot{T}_{ia} \\ \dot{T}_m \\ \dot{I} \end{bmatrix}; x(t) = \begin{bmatrix} T_{ia} \\ T_m \\ I \end{bmatrix}; u(t) = \begin{bmatrix} T_{spj} \\ T_{oa} \end{bmatrix}.$$

As described in detail below, the controller 212 uses a two-step process to parameterize the system. In the first step, the controller 212 identifies the system parameters θ={θ$_1$, θ$_2$, θ$_3$, θ$_4$, θ$_5$, θ$_6$} (i.e., the values of C$_{ia}$, C$_m$, R$_{mi}$, R$_{oi}$, K$_{p,j}$, K$_{i,j}$. The disturbance state d is then introduced into the model and an Kalman estimator gain is added, such that in the second step the controller 212 identifies the Kalman gain parameters K. In some embodiments, the temperature setpoint T$_{sp}$ is not used as a system input, rather, $\dot{Q}_{HVAC}$ is used as a direct input for controller 212 in generating a control signal for the HVAC equipment 210.

As used herein, the term 'variable' refers to an item/quantity capable of varying in value over time or with respect to change in some other variable. A "value" as used herein is an instance of that variable at a particular time. A value may be measured or predicted. For example, the temperature setpoint T$_{sp}$ is a variable that changes over time, while T$_{sp}$(3) is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
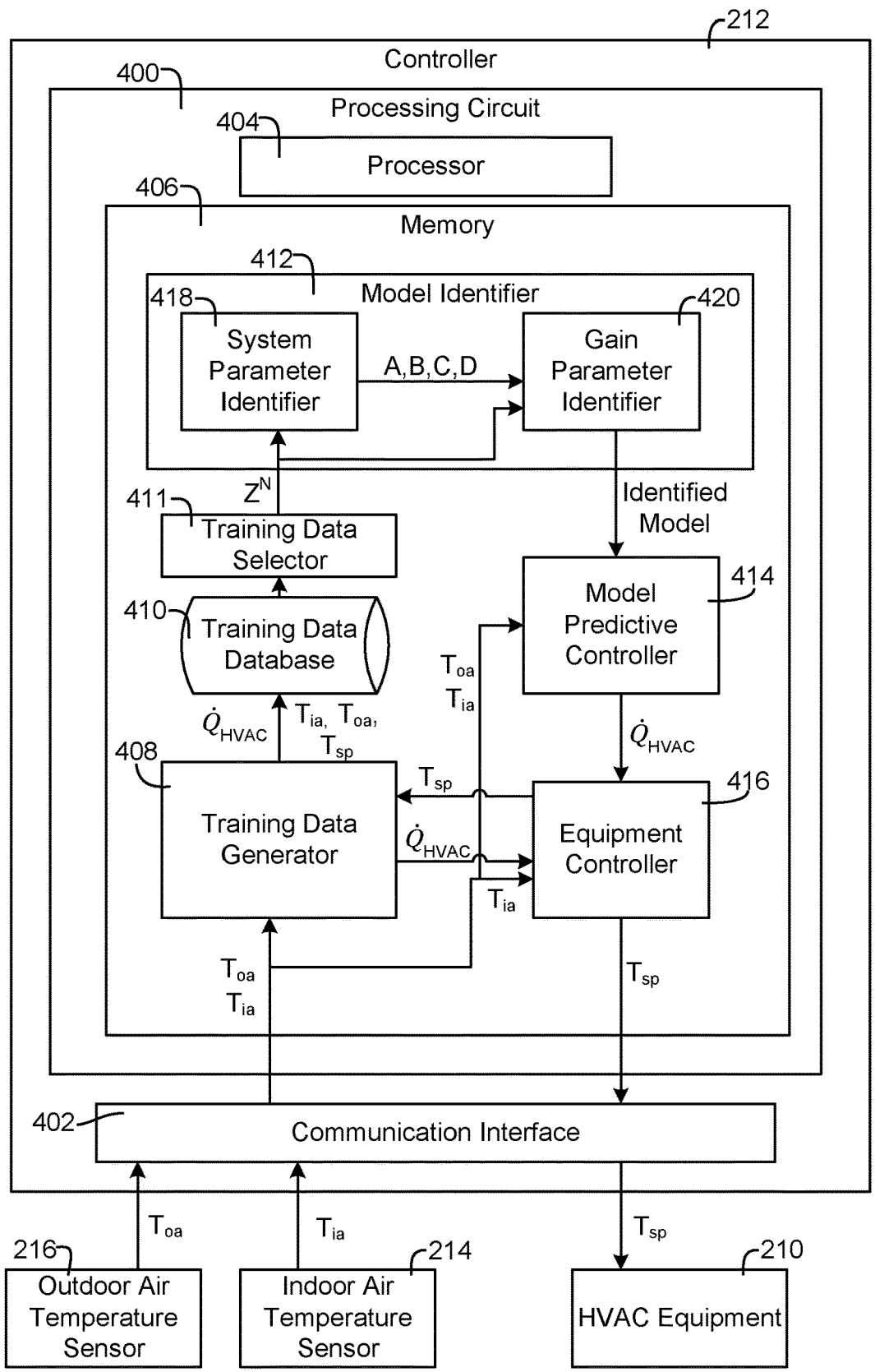
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements T$_{oa}$ and T$_{ia}$ to be received by the processing circuit 400. The communication interface 402 also facilitates communication between the processing circuit 400 and the HVAC equipment 210 that allows a control signal (indicated as temperature setpoint T$_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a training data selector 411, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint Tsp that serves as a control signal for the HVAC equipment 210. The equipment controller receives inputs of the indoor air temperature T$_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses T$_{ia}$ and $\dot{Q}_{HVAC}$ to generate T$_{sp}$ by solving Eq. A and Eq. B above for T$_{sp}$. The equipment controller 416 then provides the control signal T$_{sp}$ to the HVAC equipment 210 via the communication interface 402.

The model predictive controller 414 determines $\dot{Q}_{HVAC}$ based on an identified model and the temperature measurements T$_{ia}$, T$_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. In some embodiments, the training data generator 408 provides various $\dot{Q}_{HVAC}$ values to the equipment controller 416 for a number N of time steps k, and receives the measured output response of the indoor air temperature T$_{ia}$ at each time step k, from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.). In some embodiments, the training data generator 408 provides various $T_{sp}$ values to the equipment controller 416 instead of the various values of $\dot{Q}_{HVAC}$. As on example, a pseudo-random binary signal may be used to generate the $\dot{Q}_{HVAC}$ values or $T_{sp}$ values to execute a training experiment. As another example, the training data generator 408 may be configure to provide persistent excitation in accordance with the disclosure of U.S. patent application Ser. No. 16/516,928, filed Jul. 19, 2019, the entire disclosure of which is incorporated by reference herein, or as described in detail below starting at FIG. 10A.

If the equipment controller 416 receives the various $\dot{Q}_{HVAC}$ values, various control inputs $T_{sp}$ can be generated in response. The temperature setpoint $T_{sp}$ for each time step k is provided to the HVAC equipment 210, which operates accordingly to heat or cool the zone 200 (i.e., to influence $T_{ia}$). In some embodiments, the temperature setpoints $T_{sp}$ are used by the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k=0, . . . , N, or, more specifically, $T_{sp}(k)$, $T_{oa}(k)$, $T_{ia}(k)$, and $\dot{Q}_{HVAC}(k)$, for k, k=0, . . . , N. This data is grouped together in the training data database 410 in a set of training data $Z^N$. In the notation of Eq. G and Eq. H, $Z^N$=[y(1), u(1), y(2), u(2), . . . , y(N), u(N)].

In the embodiments shown, the training data selector 411 is configured to determine one or more subsets of the training data for use in system identification. In some embodiments, the training data selector 411 is configured to execute process 900 of FIG. 9, which is explained in detail below with reference to FIG. 9.

The training data selector 411 is configured to divide the training data into multiple subsets corresponding to multiple time segments. Each time segment may correspond to a day, a half day, a week, etc. For example, the training data stored in the training data database 410 represents a week worth of data, the training data selector 411 can consider that as seven day-long segments of data. Each time segment may have a duration corresponding to a minimum test duration which includes a minimum amount of data (e.g., number of time steps) needed by the system identification process to properly identify a system model.

The training data selector 411 then performs multiple assessment (e.g., three assessments) for each of the time segments, in some embodiments. The multiple assessments include a first assessment of a correlation between temperature setpoints during the segment and measured temperatures during the segment (i.e., assessing how well-controlled the system is during the segment), a second assessment of an amount of time spent at a low load on the equipment during the segment (i.e., assessing whether sufficient time at higher loads is present), and a third assessment of the durations of intervals between setpoint changes during the segment (i.e., assessing whether a sufficient amount of proper-frequency excitations are present). Additional details are proved below. If a segment passes the plurality of assessments assessments, the segment is selected for use as part of a set of training data and is provided to the model identifier 412 in the set of training data $Z^N$. If a segment fails one or more of the assessments, the data for that segment is excluded from the set of training data $Z^N$ and not provided to the model identifier 412. Accordingly, the data used by the model identifier 412 as described below to identify a system model is selected to satisfy multiple criteria designed to ensure accuracy of the resulting system model.

In some embodiments, the training data selector 411 additionally or alternatively refines the training data using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
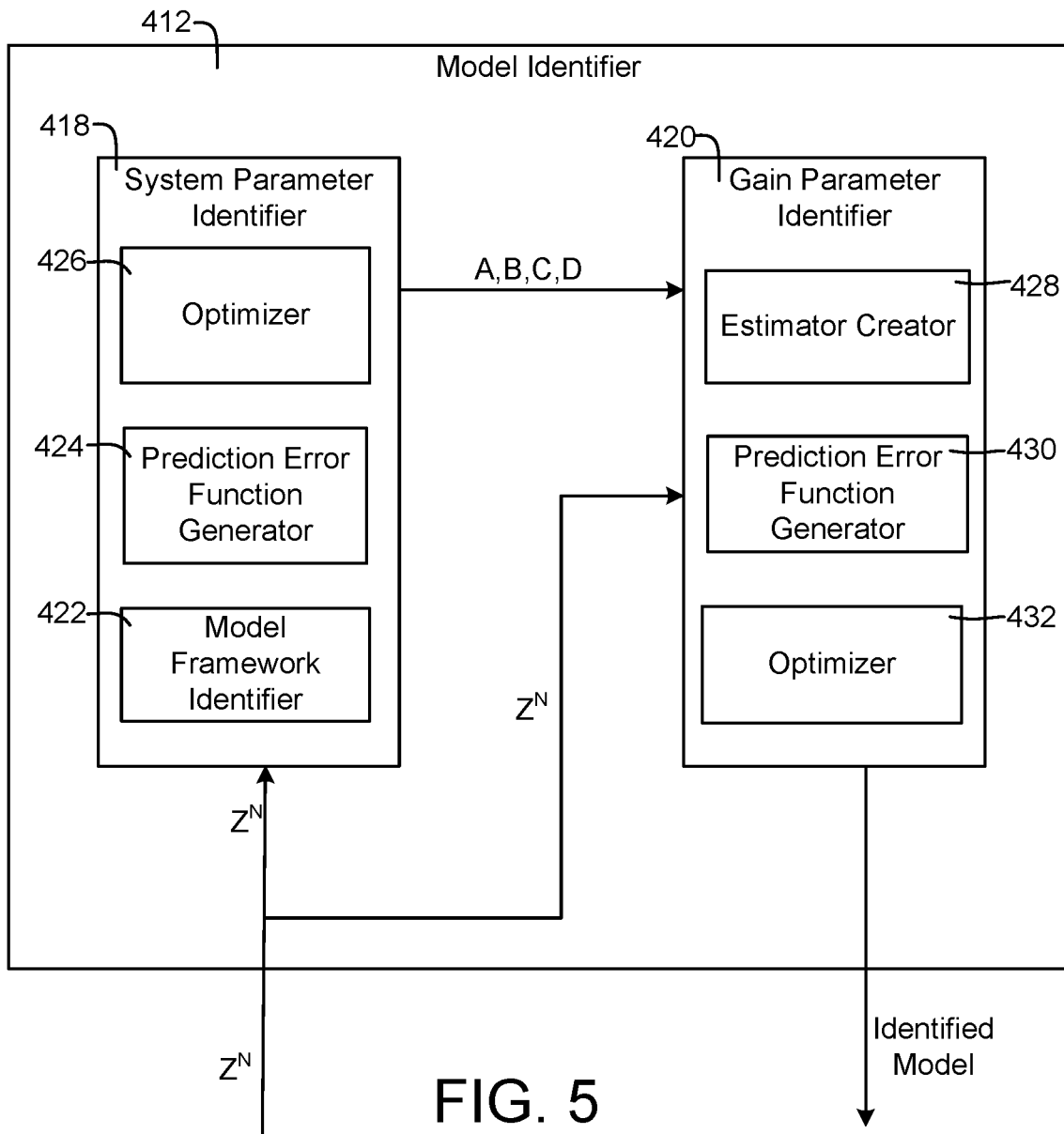
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta=\{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$ and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t)=A_c(\theta)x(t)+B_c(\theta)u(t); \quad \text{(Eq. G)}$$

$$y(t)=C_c(\theta)x(t)+D_c(\theta)u(t); \quad \text{(Eq. H)}.$$

The model framework identifier 422 thereby determines that the system parameter identifier 418 has the goal of determining a parameter vector $\hat{\theta}_N$ from the set of $\theta \in D_{\mathcal{M}} \subset \mathbb{R}^d$, where $D_{\mathcal{M}}$ is the set of admissible model parameter values. The resulting possible models are given by the set: $M = \{\mathcal{M}(\theta), \theta \in D_{\mathcal{M}}\}$. The goal of the system parameter identifier 418 is to select a parameter vector $\hat{\theta}$ N from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}HVAC(k)$, for k, k=0, ..., N) into the notation of Eq. G-H as input/output data $Z^N = [y(1), u(1), y(2), u(2), \ldots, y(N), u(N)]$.

The prediction error function generator 424 receives the model framework $M = \{\mathcal{M}\theta), \theta \in D_{\mathcal{M}}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N = \hat{\theta}_N(Z^N) = \arg \min_{\theta \in D_{\mathcal{M}}} V_N(\theta, Z^N).$$

The prediction error function generator 424 use one or more of several possible prediction error approaches to generate a prediction performance function $V_N(\theta, Z^N)$. In the embodiment shown, the prediction error function generator applies a simulation approach. In the simulation approach, the prediction error function generator 424 uses the model $\mathcal{M}(\theta)$, the input trajectory $[u(1), u(2), \ldots, u(N)]$, and an initial state $x(0)$ to produce predicted outputs in terms of $\theta$. That is, the prediction error function generator 424 predicts:

$$[\hat{y}(1|0,\theta), \hat{y}(2|0,\theta) \ldots \hat{y}(k|0,\theta) \ldots, \hat{y}(N|0,\theta)],$$

where $\hat{y}(k|0, \theta)$ denotes the predicted output at time step k given the training data from time 0 and the model $\mathcal{M}(\theta)$. The prediction error function generator 424 then calculates a prediction error at each time step k is given by $\varepsilon(k, \theta) := y(k) - \hat{y}(k|0,\theta)$. The prediction error function generator 424 then squares the two-norm of each prediction error $\varepsilon(k, \theta)$ and sums the results to determine the prediction performance function, which can be written as:

$$V_N(\theta, Z^N) = \Sigma_{k=1}^N \|y(k) - \hat{y}(k|0,\theta)\|_2^2 \qquad \text{(Eq. I)}.$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $\mathcal{M}(\theta)$ the model to predict the output one step ahead in terms of $\theta$. That is, in the one-step ahead prediction error method, the prediction error function generator 424 generates one-step ahead predictions $\hat{y}(k|k-1, \theta)$, which denotes the predicted output at time step k given the past input-output sequence $Z^{k-1}$ and using parameters $\theta$. The one-step ahead prediction $\hat{y}(k|k-1, \theta)$ is then compared to the measured output $y(k)$ by the prediction error function generator 424 to determine the prediction error at k, defined as $\varepsilon(k, \theta) := y(k) - \hat{y}(k|k-1, \theta)$. The prediction error function generator 424 then squares the two-norm of the prediction errors for each k and sums the results, generating a prediction performance function that can be expressed in a condensed form as:

$$V_N(\theta, Z^N) = \frac{1}{N}\sum_{k=1}^N \|y(k) - \hat{y}(k|k-1, \theta)\|_2^2. \qquad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in $\theta$ to determine $\theta_N$. More specifically, the optimizer 426 finds the minimum value of the prediction error function $V_N(\theta, Z^N)$ as $\theta$ is varied throughout the allowable values of $\theta \in D_{\mathcal{M}}$. That is, the optimizer 426 determines $\hat{\theta}_N$ based on:

$$\hat{\theta}_N = \hat{\theta}_N(Z^N) = \arg \min_{\theta \in D_{\mathcal{M}}} V_N(\theta, Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\hat{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix} \begin{bmatrix} x(t) \\ d(t) \end{bmatrix} + \begin{bmatrix} B_c \\ 0 \end{bmatrix} u(t);$$

$$y(t) = [C_c \quad C_d] \begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{C_{ia}} \text{ and } C_d = 0.$$

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix} \hat{x}(t+1|t) \\ \hat{d}(t+1|t) \end{bmatrix} = \begin{bmatrix} A_{dis} & B_{d_{dis}} \\ 0 & I \end{bmatrix} \begin{bmatrix} \hat{x}(t|t-1) \\ \hat{d}(t|t-1) \end{bmatrix} + \begin{bmatrix} B_{dis} \\ 0 \end{bmatrix} u(t) +$$ (Eq. K)

$$\underbrace{\begin{bmatrix} K_x(\phi) \\ K_d(\phi) \end{bmatrix}}_{=:K(\phi)} (y(t) - \hat{y}(t|t-1));$$

$$\hat{y}(t|t-1) = \begin{bmatrix} C_{dis} & 0 \end{bmatrix} \begin{bmatrix} \hat{x}(t|t-1) \\ \hat{d}(t|t-1) \end{bmatrix} + D_{dis} u(t).$$ (Eq. L)

The matrix $K(\phi)$ is the estimator gain parameterized with the parameter vector $\phi$ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = [\phi_7 \ \phi_8].$$

In this notation, $\hat{x}(t+1|t)$ is an estimate of the state at time t+1 obtained using the Kalman filter and made utilizing information at sampling time t. For example, with a sampling time of five minutes, $\hat{x}(t+1|t)$ is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
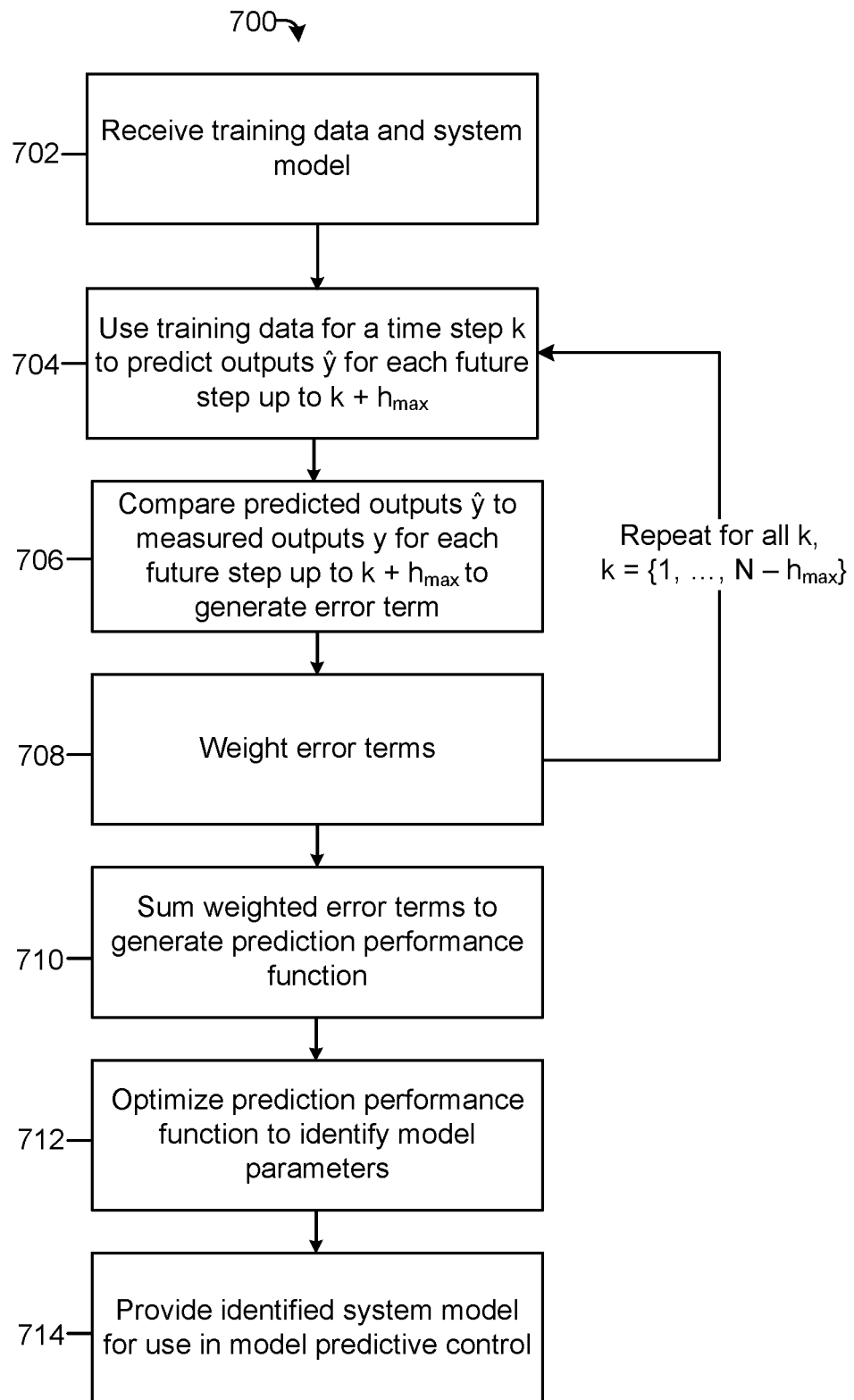
FIG. 7 is a flowchart of a multi-step ahead prediction error method for use in system identification, according to some embodiments.
Figure 8:
FIG. 8 is a visualization to aid explanation of the multi-step ahead prediction error method shown in FIG. 7, according to some embodiments.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $\mathcal{M}(\theta)$ the model to predict the output multiple step ahead in terms of $\phi$. That is, in the multi-step ahead prediction error method, the prediction error function generator 430 generates multi-step ahead predictions $\hat{y}(k+h|k-1, \phi)$, which denotes the predicted output at time step k+h given the past input-output sequence $Z^{k-1}$ and using parameters $\phi$. The index h corresponds the number of steps ahead the prediction is made, and for each time step k predictions are made for h=0, ..., $h_{max}$ (i.e., when h=2, the prediction is three steps ahead because h is indexed from zero).

Each multiple multi-step ahead prediction $\hat{y}(k+h|k-1, \phi)$ is then compared to the corresponding measured output $y(k)$ by the prediction error function generator 430 to determine the prediction error at k, defined as $\varepsilon(k, \theta) := y(k) - \hat{y}(k+h|k-1, \phi)$. The prediction error function generator 430 then squares the two-norm of the prediction errors for each k and sums the results, in some embodiments using a weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h) \|y(k+h) - \hat{y}(k+h|k-1, \phi)\|_2^2.$$ (Eq. M)

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg\min_\phi V_N(\phi, Z^N).$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1) = Ax(k) + Bu(k);$$

$$y(k) = Cx(k) + Du(k).$$

where the one-step prediction of $\hat{x}(k+1|k)$ using a steady-state Kalman gain is:

$$\hat{x}(k+1|k) = A\hat{x}(k|k-1) + Bu(k) + K(y(k) - C\hat{x}(k|k-1) - Du(k));$$

$$\hat{y}(k|k-1) = C\hat{x}(k|k-1) + Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}=3$. The one-step prediction (with the prediction error function generator 430 given x0) is given by the equation:

$$\hat{x}(1|0) = Ax0 + Bu(0) + K(y(0) - Cx0 - Du(0));$$

$$\hat{y}(0|0) = Cx0 + Du(0).$$

The prediction of the second step is $$\hat{x}(2|0) = A\hat{x}(1|0) + Bu(1) = A(Ax0 + Bu(0) + K(y(0) - Cx0 - Du(0))) + Bu(1);$$

$$\hat{y}(1|0) = C\hat{x}(1|0) + Du(1) = C(Ax0 + Bu(0) + K(y(0) - Cx0 - Du(0))) + Du(1).$$

The prediction of the third step is $$\hat{x}(3|0) = A\hat{x}(2|0) + Bu(2) =$$
$$A(A(Ax0 + Bu(0) + K(y(0) - Cx0 - Du(0))) + Bu(1)) + Bu(2);$$

$$\hat{y}(2|0) = C\hat{x}(2|0) + Du(2) =$$
$$C(A(Ax0 + Bu(0) + K(y(0) - Cx0 - Du(0))) + Bu(1)) + Du(2).$$

The forth step prediction is $$\hat{x}(4|0) = A\hat{x}(3|0) + Bu(3) =$$
$$A(A(A(Ax0 + Bu(0) + K(y(0) - Cx0 - Du(0))) + Bu(1)) + Bu(2)) + Bu(3);$$

$$\hat{y}(3|0) = C\hat{x}(3|0) + Du(3) =$$
$$C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1), u(2), and u(3), the pattern revealed is:

$$\hat{x}(1|0) = Ax0 + Bu(0) + K(y(0) - Cx0 - Du(0));$$

$$\hat{x}(1|0) = (A^2 - AKC)x0 + (AB - AKD)u(0) + Bu(1) + AKy(0);$$

$$\hat{x}(3|0) = (A^3 - A^2KC)x0 + (A^2B - A^2KD)u(0) + ABu(1) + Bu(2) + A^2Ky(0);$$

$$\hat{x}(4|0) = (A^4 - A^3KC)x0 + (A^3B - A^3KD)u(0) + A^2Bu(1) + ABu(2) + Bu(3) + A^3Ky(0);$$

$$\hat{y}(0) = Cx0 + Du(0);$$

$$\hat{y}(1|0) = (CA - CKC)x0 + (CB - CKD)u(0) + Du(1) + CKy(0);$$

$$\hat{y}(2|0) = (CA^2 - CAKC)x0 + (CAB - CAKD)u(0) + CBu(1) + Du(2) + CAKy(0);$$

$$\hat{y}(3|0) = (CA^3 - CA^2KC)x0 + (CA^2B - CA^2KD)u(0) + CABu(1) + CBu(2) + Du(3) + CA^2Ky(0).$$

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{\hat{y}}(0) = \begin{bmatrix} \hat{y}(0) \\ \hat{y}(1|0) \\ \hat{y}(2|0) \\ \hat{y}(3|0) \end{bmatrix}, \tilde{y}(0) = \begin{bmatrix} y(0) \\ y(1) \\ y(2) \\ y(3) \end{bmatrix},$$

$\hat{x}(1|0)$ and $x0$ remain unchanged.

The new system that has the 4-step prediction casted into a one-step prediction which can be analyzed by the prediction error function generator 430 using an existing system identification software product as:

$$\hat{x}(1|0) = Ax0 + [B \ 0 \ 0 \ 0 \ 0]\tilde{u}(0) + [K \ 0 \ 0 \ 0](\tilde{y}(0) - \tilde{\hat{y}}(0));$$

$$\tilde{\hat{y}}(0) = \begin{bmatrix} C \\ (CA - CKC) \\ (CA^2 - CAKC) \\ (CA^3 - CA^2KC) \end{bmatrix} x0 +$$

$$\begin{bmatrix} D & 0 & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} \tilde{y}(0).$$

In order to have the general formulation at time k for predicting $h_{max}$ step ahead in time, this four-step example can be extrapolated to define the general augmented input and output vectors as:

$$\tilde{\hat{y}}(k) = \begin{bmatrix} C \\ (CA - CKC) \\ (CA^2 - CAKC) \\ \vdots \\ (CA^{h_{max}} - CA^{h_{max}}KC) \end{bmatrix} \hat{x}(k|k-1) +$$

$$\begin{bmatrix} D & 0 & 0 & 0 & 0 & 0 & 0 \\ (CB - CKD) & D & 0 & 0 & 0 & 0 & CK \\ (CAB - CAKD) & CB & D & 0 & 0 & 0 & CAK \\ (CA^2B - CA^2KD) & CAB & \ddots & \ddots & 0 & 0 & CA^2K \\ \vdots & \vdots & \ddots & CB & D & 0 & \vdots \\ (CA^{h_{max}-1}B - CA^{h_{max}-1}KD) & CA^{h_{max}-2}B & \cdots & CAB & CB & D & CA^{h_{max}-1}K \end{bmatrix}$$

$$\tilde{u}(k);$$

$$\tilde{u}(k) = \begin{bmatrix} u(k) \\ u(k+1) \\ \vdots \\ u(k+h_{max}) \\ y(k) \end{bmatrix}, \tilde{\hat{y}}(k) = \begin{bmatrix} \hat{y}(k|k-1) \\ \hat{y}(k+1|k-1) \\ \vdots \\ \hat{y}(k+h_{max}|k-1) \end{bmatrix}, \tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$$\hat{x}(k+1|k) = A\hat{x}(k|k-1) + [B0 \ldots 0]\tilde{u}(k) + [K0 \ldots 0](\tilde{y}(k) - \tilde{\hat{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h) \|y(k+h) - \hat{y}(k+h|k-1, \phi)\|_2^2. \quad \text{(Eq. M)}$$

If $w(h) \equiv 1$ for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \|\tilde{y}(k) - \tilde{\hat{y}}(k, \theta)\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
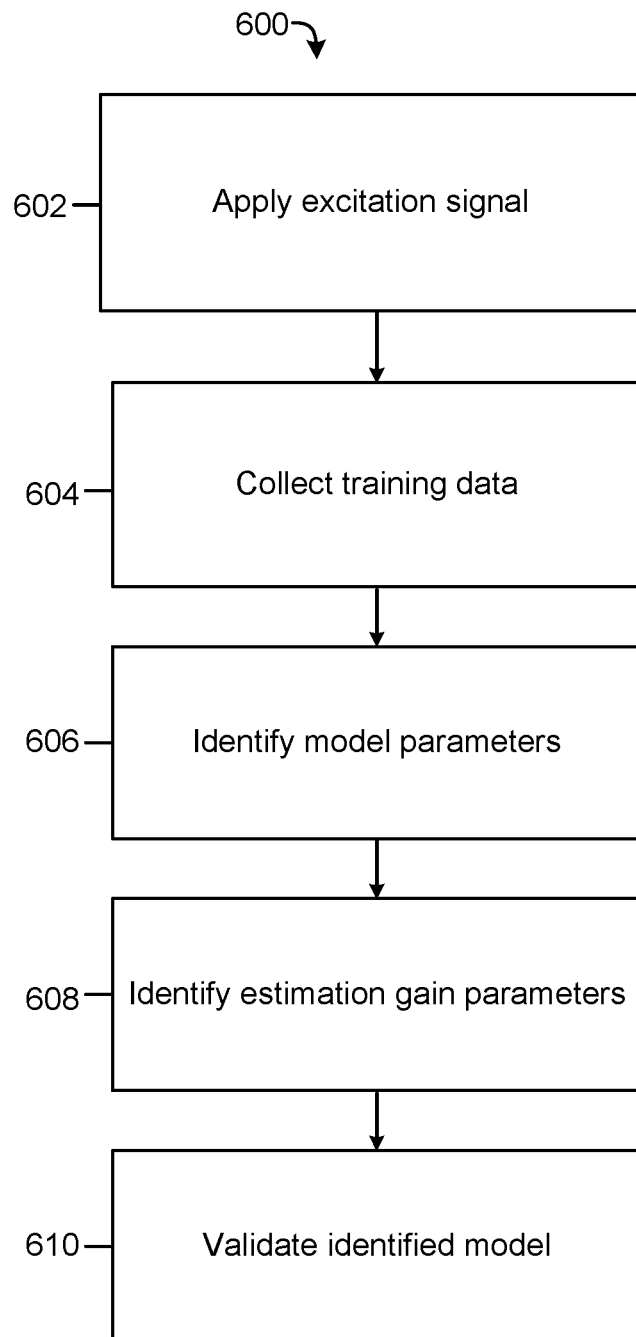
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measureable temperature readings, i.e., $T_{oa}$ and $T_{ia}$, controller-determined values $\dot{Q}_{HVAC}$ and $T_{sp}$ for each of a plurality of time steps k, k=0, . . . , N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \quad \text{(Eq. G)}$$

$$y(t) = C_c(\theta)x(t) + D_c(\theta)u(t). \quad \text{(Eq. H)}$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail below with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby by dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N = [y(1), u(1), y(2), \ldots, u(2), \ldots, y(N), u(N)]$ from the training data database 410. The training data includes measured outputs y(k) (i.e., $T_{ia}(k)$ and $\dot{Q}_{HVAC}(k)$) and inputs u(k) (i.e., $T_{oa}(k)$ and $T_{sp}(k)$) for each time step k, k=1, . . . , N. N is the number of samples in the training data. The gain parameter identifier 420 also receives the system model from the system parameter identifier 418. The training data $Z^N$ can be selected by the training data selector 411, for example according to process 900 described in detail below. Although the notation $Z^N = [y(1), u(1), y(2), u(2), \ldots, y(N), u(N)]$ suggests that continuous or sequential time steps are chosen, various embodiment herein are also configured to provide and handle scenario where the training data represents separate time segments (e.g., separated in time from one another).

At step 704, the prediction error function generator 430 uses the training data for a time step k to predict outputs ŷ for each subsequent time step up to k+$h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}$=2 in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs [ŷ(k|k−1), ŷ(k+1|k−1), . . . ŷ(k+$h_{max}$|k−1)] are predicted based on the past training data (i.e., through step k−1), denoted as $Z^{k-1}$, along with future inputs [u(k), u(k+1) . . . u(k+$h_{max}$)]. These predictions are made using the model $\mathcal{M}(\phi)$, such that predicted outputs ŷ depend on φ.

To illustrate the predictions of step 704, FIG. 8 shows a simplified visualization in which y(k) and ŷ(k) are depicted as scalar values for the sake of simplified explanation. In FIG. 8, the graph 800 plots the values of y and ŷ over time t for five time steps past a starting time t=0. The solid circles 802 represent measured outputs y(t) from the training data. The unfilled boxes 804 represent predicted outputs ŷ(t|0), that is, the outputs predicted for each time step based on the input/output data available at time t=0 (e.g., y(0)). The dashed lines represent the propagation of the predictions; for example, graph 800 includes three unfilled boxes 804 connected by a dashed line to the solid circle 802 corresponding to y(0). This shows that the predictions $\hat{y}(t|0)$, $1 \leq t \leq 3$, represented by the unfilled boxes 804 were based on the measured value of y(0).

At step 706, the prediction error function generator 430 compares the predicted outputs $\hat{y}$ to the measured outputs y for each future step up to $k+h_{max}$ (i.e., for all predicted outputs $\hat{y}$ generated at step 704). More specifically, an error term for each step may be defined as $y(k+h)-\hat{y}(k+h|k-1, \phi$. Because y and $\hat{y}$ are vectors, the two-norm of this error term may be taken and squared to facilitate comparison between prediction errors as scalars, such that the error term becomes $\|y(k+h)-\hat{y}(k+h|k-1, \phi)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function w(h). The weighting function w(h) allows the prediction errors to be given more or less weight depending on how many steps ahead the prediction is. The weighting function w(h) is preferably a monotonically decreasing function of h, so that farther-out-in-time predictions have less influence on the prediction error. In some embodiments, the weighting function w(h)=1. Step 708 thereby corresponds the w(h) term in Eq. M above.

The process 700 then returns to step 704 to repeat steps 704-706 for each value of k, k=1, N-$h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., $\hat{y}(t|1)$, for t=2, 3, 4. The unfilled triangles chart the predictions based on the output data available at time t=2, i.e., $\hat{y}(t|2)$, for t=3, 4, 5. Process 700 therefore involves making multiple predictions for most time steps: for example, FIG. 8 shows three separate predictions for time t=3.

At step 706, the prediction error function generator 430 again compares the predicted outputs $\hat{y}$ for the new value of k to the measured outputs y for each future step up to $k+h_{max}$ to define the error term $\|y(k+h)-\hat{y}(k+h|k-1, \theta)\mu_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\theta, Z^N) = \sum_{k=1}^{N-h_{max}+1} \sum_{h=0}^{h_{max}} w(h) \|y(k+h) - \hat{y}(k+h|k-1, \phi)\|_2^2. \quad \text{(Eq. M)}$$

The prediction performance function is a function of the input data $Z^N$ and the parameter variable $\phi$. Typically, the input data $Z^N$ is given (i.e., received by the model identifier 412 and used in the calculation of error terms as described above). Thus, the prediction performance function is primarily a function of $\phi$.

At step 712, the prediction performance function $V_N(\phi, Z^N)$ is minimized to find an optimal parameter vector $\hat{\theta}_N = \arg\min_{\theta \in D_M} V_N(\phi, Z^N)$. Any minimization procedure may be followed. The result of step 712 is a vector $\hat{\phi}_N$ of identified model parameters that tune the model $\mathcal{M}(\hat{\phi}_N)$ to accurately predict system evolution multiple steps ahead. At step 714, the model identifier 412 provides the identified system model (i.e., $\mathcal{M}(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Figure 9:
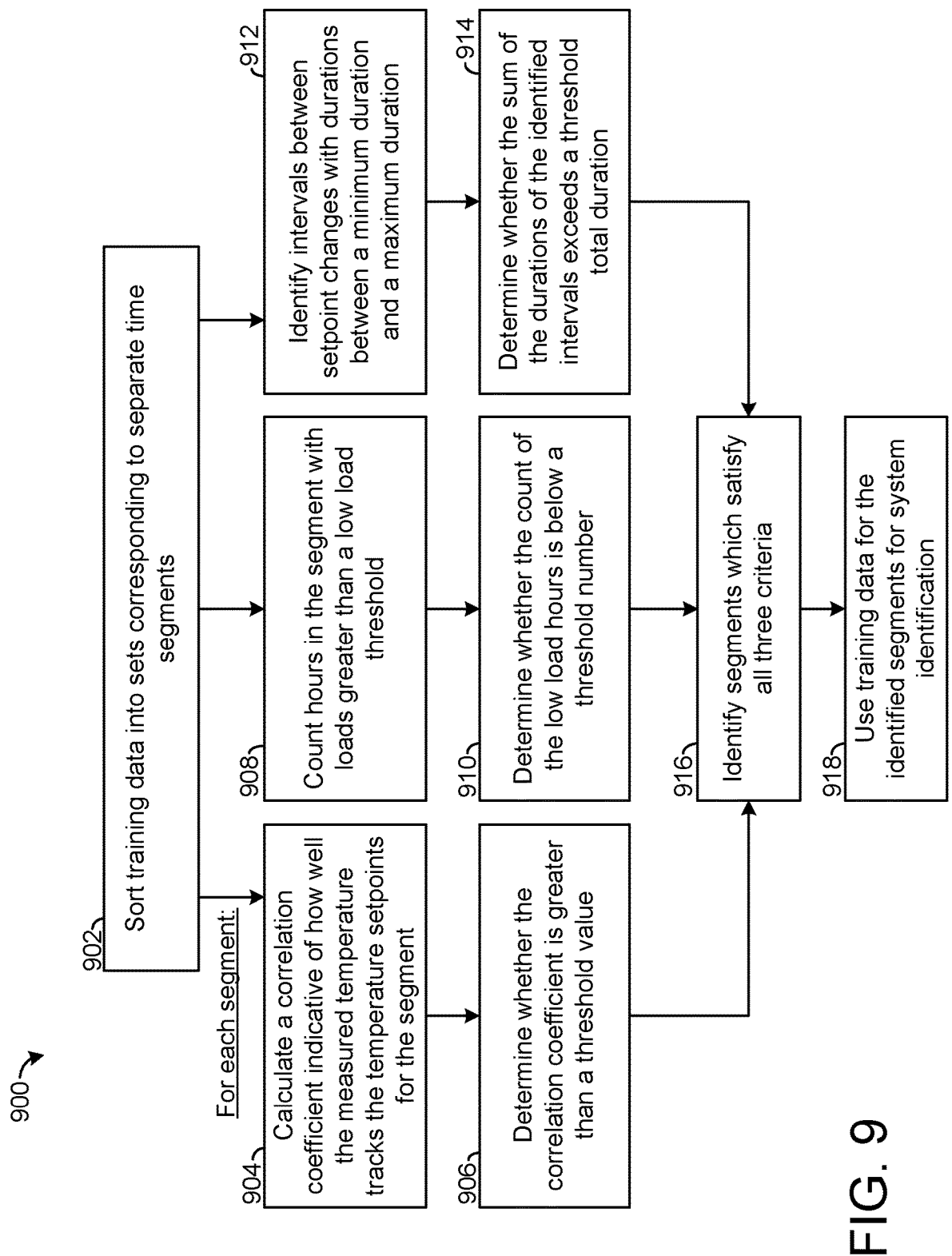
FIG. 9 is a flowchart of a process for selecting training data for use in system identification, according to some embodiments.

Referring now to FIG. 9, a flowchart of a process 900 for selecting training data for use in training the system model is shown, according to an exemplary embodiment. The process 900 can be executed by the controller 212 of FIG. 4, in particular by the processor 404 executing program instructions stored in the memory 406 (e.g., at training data selector 411). The process 900 outputs selected training data which can be provided at step 702 of FIG. 7 to initiate the process 700 described above.

At step 902, a collection of stored training data is sorted into sets corresponding to separate time segments. Each time segment may correspond to a day, a half day, a week, etc. For example, in an example where the training data stored in the training data database 410 represents a week worth of data, the training data selector 411 can consider that as seven day-long segments of data. Each time segment may have a duration corresponding to a minimum test duration which includes a minimum amount of data (e.g., number of time steps) needed by the system identification process to properly identify a system model. The training data can include a zone setpoint temperature $T_{sp}$ (e.g., units of degrees Celsius, degrees Fahrenheit, degrees Kelvin) and associated time stamp, a zone indoor air temperature $T_{ia}$ (e.g., units of degrees Celsius, degrees Fahrenheit, degrees Kelvin) and associated time stamp, and heat provided by the HVAC system $\dot{Q}_{HVAC}$ (e.g., units of kilowatt) and associated time stamp, for each of many time steps indicated by different time stamps.

The process 900 then includes performance of multiple (e.g., three, four) assessments (tests, checks, etc.) for each of the multiple segments. This includes a first assessment (shown as steps 904 and 906) of a correlation between temperature setpoints and measured temperatures, a second assessment (shown as steps 908 and 910) of time spend at low load, and a third assessment (shown as steps 912 and 914) of the frequency of excitations of the system based on durations of intervals between setpoint changes. These steps are performed for each segment of the training data identified at step 902.

Steps 904 and 906 are executed to provide the first assessment, which corresponds to a correlation criterion. At step 904, a correlation coefficient is calculated which is indicative of how well the measured temperature tracks the time-varying temperature setpoint for the segment. In some embodiments, the correlation coefficient of the two variables is a measure of their linear dependence, which is an indicator showing if the system is under control. For example, the following formulation can be used:

$$\rho(T_{sp}, T_{ia}) = \frac{\text{cov}(T_{sp}, T_{ia})}{\sigma_{T_{sp}}\sigma_{T_{ia}}}$$

where $\rho(T_{sp}, T_{ia})$ is the correlation coefficient, $\text{cov}(T_{sp}, T_{ia})$ is covariance of setpoint $T_{sp}$ and indoor air temperature $T_{ia}$, $\sigma_{T_{sp}}$ and $\sigma_{T_{ia}}$ are the standard deviation of $T_{sp}$ and $T_{ia}$ segment respectively. In this example, this formula is applied to the training data for the segment to calculate the correlation coefficient. Variations of this formulation are possible in various embodiments to calculate correlation coefficients.

At step 906, the correlation coefficient is compared to a threshold value. In the example formulation above, the correlation coefficient can have values between 0 and 1, where a higher correlation coefficient indicates a higher degree of correlation between the temperature setpoint and the measured air temperature, thereby indicating that the system is better under control, whereas a lower correlation coefficient indicates that the measured air temperature is not tracking the setpoint as well and that the system is less controlled. A threshold value is predetermined (preprogrammed, preset) which indicates a sufficient level of correlation between the temperature setpoint and the measured air temperature for providing quality data. For example, a threshold value in a range between approximately 0.6 and 0.8 may be used as the threshold value, for example 0.7. If the correlation coefficient is less than the threshold value, the segment is considered to have failed the first assessment and not satisfied the correlation criterion. If the correlation coefficient is greater than the threshold value, the segment is considered to have passed the first assessment and satisfied the correlation criterion.

Steps 908 and 910 are executed to provide the second assessment. At step 908, hours in the segment with loads greater than a low load threshold are counted. That is, the load on the HVAC equipment (e.g., the provided by the HVAC system $\dot{Q}_{HVAC}$) at each hour (or other sub-period) in the segment is determined and compared to a low load threshold. The low load threshold provides a value below which the load is considered to be too low to provide useful data for system identification. In some embodiments, the low load threshold is a predetermined value having units of load (e.g., kilowatts). In some embodiments, the low load threshold is determined as a percentage of a maximum equipment load, for example calculated as 10% of the maximum load during the segment (or during some other time period). At step 908, each hour with a load less than the low load threshold is counted, while hours with loads above the low load threshold are not counted. The number of hours in the segment with loads below the low load threshold (i.e., the count of low load hours) is thereby determined at step 908. Alternatively, the number of hours with loads above the low load threshold (i.e., a count of higher load hours) can be determined in a similar manner.

At step 910, the count (total number) of hours in the segment with loads below the low load thresholds is compared to a threshold number. If the count of low load hours is less than the threshold number, the segment is considered to have sufficient HVAC operation to contain useful data for use in system identification. The segment then passes the second assessment and satisfies a low load criterion. If the count of low load hours is greater than the threshold number, the segment is considered to have insufficient HVAC operation to contain useful data for use in system identification and the segment fails the second assessment (i.e., does not satisfy the low load criterion). In equivalent embodiments, a threshold number can be compared to a count of higher load hours and the second assessment passed/satisfied when the count is greater than the threshold number. In various embodiments, the threshold number can be any number between one and a maximum number corresponding to the entirety of the segment. For example, the threshold number may be selected to correspond to half of the duration of the segment.

Steps 912 and 914 are executed to perform a third assessment. At step 912, intervals between setpoint changes with durations between a minimum duration and a maximum duration are identified. For example, a time stamp for each setpoint change can be determined, and then an amount of time between consecutive setpoint changes can be calculated based on the time stamps (e.g., by subtracting the time stamp of a given setpoint change from the time stamp of the next setpoint change). This amount of time is referred to herein as a duration that a setpoint persists, a duration of an interval between setpoint changes (i.e., a duration spent at a constant setpoint following a change), a duration of a setpoint, a duration corresponding to a setpoint change, etc. In some embodiments, setpoint changes within a preset tolerance are ignored, for example setpoint changes within ±0.5 degrees, for the sake of determining whether a setpoint change has occurred. That is, changes within this resolution will not be considered as setpoint changes for the sake of performing the third assessment.

Each identified duration is then compared to an acceptable range defined by a minimum duration and a maximum duration (i.e., end points of a range). The minimum duration and the maximum duration may be defined to capture both fast-moving building thermal dynamics (e.g., changes in air temperature) and slow-moving building thermal dynamics (e.g., storage of energy in building mass) while excluding high frequency excitations that can be hard to distinguish from noise and very low frequency excitations that do not provide valuable information for system identification. For example, the minimum duration may have a preset value in a range between about one hour and about two hours in various embodiments, for example one hour. As another example, the maximum duration may have a preset value in a range between about eight hours and about twelve hours in various embodiments, for example eight hours. Setpoints that persist for durations in the range are considered to capture excitation frequencies which are useful for system model identification. Accordingly, at step 912, setpoints that persist for durations in the defined range are identified as valid setpoint changes.

At step 914, the durations associated with the valid setpoint changes are summed to get a total duration of valid setpoint changes for the segment, and the sum is compared to a threshold total duration. The threshold total duration may be defined as a smallest qualifying percentage of the duration of the segment, for example about 25% of the length of the segment. If the sum of durations of valid setpoint changes for the segment exceeds this threshold total duration, the third assessment is passed and the segment is considered as satisfying an excitation criterion. If the sum of the durations of the valid setpoint changes is less than the threshold total duration, the third assessment is failed and the segments is considered as not satisfying the excitation criterion.

In other embodiments, the amount of valid setpoint changes can be assessed using other rules as an alternative or additional test (e.g., fourth test). For example, the number of valid setpoint changes in a segment may be counted and compared to a threshold number (e.g., 4, 5, 6, etc.), such that the segment satisifies the excitation criterion if the number of valid setpoint changes is greater than the threshold number. In some embodiments, that threshold number is defined based on a count of a total number of setpoint changes for the segment (e.g., 25% of the total number, 50% of the total number, 75% of the total number). In some such embodiments, the count of valid setpoint changes compared to a threshold number is included as a fourth assessment in addition to or alternative to one or more of the other assessments of process 900.

The assessments can be repeated for multiple segments of a training period (i.e., a period in which training data is collected) to determine, for each segment, whether that segment passes the multiple assessments, e.g., satisfies the three (or four, etc.) criteria relating to multiple characteristics of the data for those segments. Accordingly, as shown in FIG. 9 according to some embodiments, the data selection approach includes conducting three (or two, or four, etc.) assessments of each segment, where each assessment involves a different characteristic (e.g., control correlation, load level, and setpoint timing) of the system behavior represented in the training data. Each segment is considered to have passed or failed each of the assessments (e.g., multiple results for each segment in the example shown). Because the assessments relate to different characteristics, the assessments work together to determine an overall quality of the training data for each segment beyond a determination that could be made with any one assessment. The combination of multiple assessments thus provides a synergy that ensures high quality training data that will result in highly accurate system identification, for example data representing periods in which the building equipment is successfully causing a measured condition to track a setpoint in situations that create rich system dynamics.

At step 916, segments which satisfy all criteria (e.g., pass all three assessments) are identified. For example, results of the assessments may be stored in a table, and then the table can be processed to determine which segments have a true, pass, etc. entry for all assessments. The segments identified as passing as all criteria are considered as corresponding to training data which is suitable for generation of an accurate predictive model via system identification, for example the system identification process 700 of FIG. 7 described above. Other system identification process that can be performed using the automatically-selected data resulting from process 900 are disclosed in U.S. patent application Ser. No. 16/738,878, filed Jan. 9, 2020, and U.S. patent application Ser. No. 16/513,054, filed Jul. 16, 2019, the entire disclosures of which are incorporated by reference herein.

Accordingly, at step 916, training data for the identified segments which pass all assessments are provided and used for system identification. In the example of FIG. 4, the training data for the identified segments is separated from the training data for the non-identified (assessment-failing) segments and provided to the model identifier 412. The training data for segments which fail one or more of the assessments (i.e., do not satisfy one or more criteria) can be discarded, ignored, deleted, etc. in various embodiments such that system identification is performed without using training data corresponding to those segments.

In some embodiments, step 916 includes determining whether a total duration of the identified segments (i.e., the segments that pass the assessments) meets a threshold duration corresponding to a sufficient amount of data for a system identification process. That is, step 916 can include a check to determine whether a sufficient amount of quality data is available in the training data received by process 900, or whether additional data needs to be obtained before system identification can proceed. In some examples, two weeks of training data is obtained and passed into step 902 and step 916 includes checking whether at least two days worth of training data (when aggregated from discontinuous segments) satisfies the assessments of steps 904-914. If sufficient quality data is available, step 916 passes the aggregated quality data onto step 918. If sufficient quality data is not available (i.e., less than a threshold amount of data passed the assessments), then step 916 can include restarting process 900 for a different or larger set of training data (e.g., data from a different two-week period) or initiating another process for supplying quality training data (e.g., generating simulated training data).

Process 900 thereby provides for automated data selection for online system identification to select data that will result in improved system models relative to training without the automated data selection process, while also substantially reducing the computing time required to perform system identification. For example, experimental results using real building data have shown that applying process 900 can improve the multistep prediction quality from 19.56% to 53.65% while also reducing the system identification algorithm running time from 32 minutes to 15 minutes. Improvements to the resulting models results in better control that more accurately tracks occupant preferences, improves comfort, reduces utility costs, and reduces energy resource consumption (e.g., reduces fossil fuel consumption, reduces carbon emissions) and improves the computing efficiency of performing system identification.

Setpoint Injection for Online Data Generation for System Identification

Figure 10A:
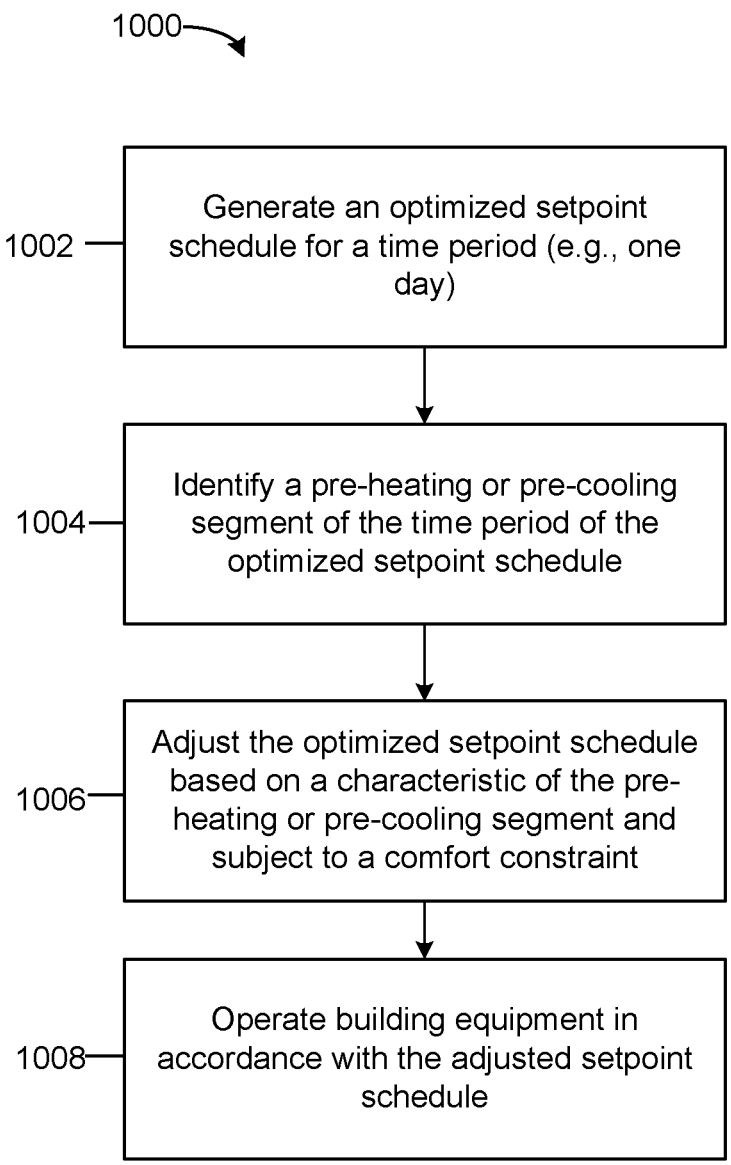
FIG. 10A is a flowchart of a process for executing an experiment to generate high quality training data, according to some embodiments.

Referring now to FIG. 10A, a flowchart of a process 1000 of operating building equipment to generate quality data while reducing energy costs and providing occupant comfort is shown, according to some embodiments. In some embodiments, the process 1000 can be executed by the controller 212, for example by the training data generator 408 of the processing circuit 400 of controller 212 shown in FIG. 2.

At step 1002, an optimized setpoint schedule for a time period is generated. The optimized setpoint schedule can be generate using one or more of a variety of optimization techniques, for example by performing a model predictive control process (e.g., an open-loop model predictive control process). The optimized setpoint schedule may be the output of an optimization (e.g., minimization) problem that seeks to optimize an objective function subject to one or more constraints, for example based on predictions of future system states provided using a predictive model of the system. For example, the objective function may represent a cost of operating building equipment over the time period, and the one or more constraints may define a range of occupant comfort (e.g., a range of comfortable indoor air temperatures for the building), for example as described in U.S. patent application Ser. No. 16/598,539, filed Oct. 10, 2019, the entire disclosure of which is incorporated by reference herein. In some examples, the objective function accounts for carbon emissions associated with the optimization, for example such that optimizing the objective function includes or considers a marginal operating emissions rate. Various other approaches for generating the optimized setpoint schedule can also be used.

It is noted that the term "optimized setpoint schedule" as used herein is not intended to require that such a schedule be a true optimal solution (i.e., the most optimal solution that could possibly be obtained), but rather only that the optimized setpoint schedule is generated as a result of performing an optimization process. For example, in some embodiments, the optimized setpoint schedule can be generated by performing an optimization process using an initial model that is later refined, updated, replaced, etc. using training generated by execution of process 1000. Accordingly, the optimized setpoint schedule generated using the initial model can be improved if a more accurate model is used and is not necessarily a perfectly optimal solution. The term "optimized setpoint schedule" may include setpoint schedules that are sub-optimal but are generated by performing an optimization process.

At step 1004, a pre-heating or pre-cooling segment of the time period of the optimized setpoint schedule is identified. The pre-heating or pre-cooling segment can also be referred to as a charge or injection. In some embodiments, the pre-heating or pre-cooling segment is identified by comparing setpoint values of the optimized setpoint schedule to a range of acceptable values. For example, if the optimized setpoint schedule defines values for a zone air temperature (e.g., indoor air temperature) at different time steps of the time period (e.g., every minute, every five minutes, every fifteen minutes, etc. for a one day period), the temperature values can be compared to a range of comfortable temperatures for zone occupants. When in a heating mode (e.g., during winter), the pre-heating segment may be defined as a segment of time for which the temperature setpoint is more than a threshold amount (e.g., one degree) higher than a lower bound on temperature (e.g., the lowest comfortable temperature). When in a cooling mode (e.g., during summer), the pre-cooling segment may be defined as a segment of time for which the temperature setpoint is more than a threshold amount lower than an upper bound on temperature (e.g., the highest comfortable temperature). When the optimized setpoint scheduled is optimized while accounting for time-varying utility prices, the pre-heating or pre-cooling period may typically occur during a period of low cost (e.g., early in a day before peak demand periods) to pre-heat or pre-cool a zone in order to reduce energy demands during later, higher-cost periods.

In some embodiments, the range of acceptable values for the setpoint which is used to define the pre-heating or pre-cooling segments is also in generating the optimized setpoint schedule. In some embodiments, the range of acceptable values (e.g., comfortable range of temperatures defined by a highest acceptable temperature and a lowest acceptable temperature) can be a pre-defined schedule (e.g., input by a user), such that the range changes over time. In other embodiments, the range of acceptable values can be automatically generated based on historical data, for example based on a history of user-input setpoint adjustments or other input indicative of user comfort or discomfort. In some embodiments, such data can be used to train a neural network which can then be used to generate upper and lower bounds on a building variable (e.g., temperature) which can change over time based on various inputs (e.g., time of day, day of week, season, weather, outdoor air temperature, etc.), for example as described in U.S. patent application Ser. No. 17/338,351, filed Jun. 3, 2021, the entire disclosure of which is incorporated by reference herein.

Step 1004 can also include determining one or more characteristics of the pre-heating or pre-cooling segment (charge segment, charge period). For example, a duration of the charge segment can be determined. As another example, a timing of the charge segment can be determined in step 1004 (e.g., a beginning time of the charge segment, an end time of the charge segment, etc.), for example a comparison between a beginning or end time of an ON period for heating or cooling equipment and a beginning or end time of the charge segment. As another example, a difference in setpoint value from a minimum or maximum of an acceptable range of values is determined in step 1004. Various other characteristics of the charge segment can be determined in some embodiments. As another example, discharge periods (i.e., time segments other than charge periods) can be identified and assessed in step 1004

At step 1006, the optimized setpoint schedule is adjusted based on the characteristic of the pre-cooling or pre-heating segment and subject to a comfort constraint. The adjustment is performed in order to cause additional excitation of system dynamics in order to generate high quality training data for later use in identifying a system model, e.g., for use in refining a system model used to generate the optimized setpoint schedule. By adjusting the optimized setpoint schedule subject to a comfort constraint, the adjusted schedule can maintain cost, energy, and/or emissions reductions achieved by the optimized setpoint schedule while maintaining occupant comfort while also increasing the quality of training data generated over the time period.

Various examples of how the optimized setpoint schedule can be adjusted based on the characteristic and subject to a comfort constraint are shown in FIGS. 11-18 and described in detail with reference thereto below. The adjustments at step 1006 can be performed based on predefined-rules-based logic as described with reference to FIGS. 11-18. For example, in most scenarios the adjustments may results in a charge segment of two hours near a beginning of an ON period for building and another charge segment ending at an end of the ON period of the building (e.g., a period for which building equipment is active/available to heat/cool a building, a period for which a building is occupied, etc.). The adjustments may ignore an OFF period, i.e., a period for which the building equipment remains off (e.g., during an unoccupied period for the building). The rules-based logic for adjusting the optimized setpoint schedule described below has been experimentally verified to result in higher quality training data (e.g., more accurate predictive models generating using such data) as compared to making no adjustments and as compared to other types of adjustments that may be possible.

Figure 10B:
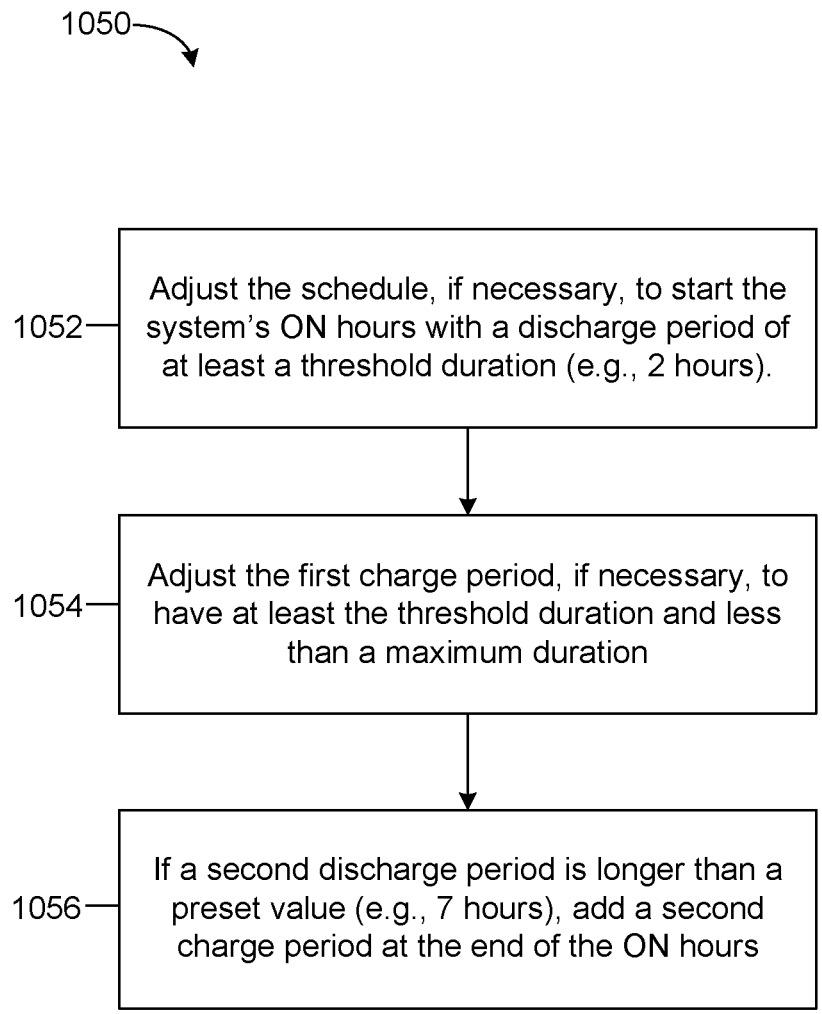
FIG. 10B is a flowchart of a process for adjusting setpoints as part of some examples of FIG. 10A, according to some embodiments.

Details of such logic for adjusting the optimized setpoint schedule is described with reference to FIGS. 11-18 below and shown in an example in FIG. 10B. FIG. 10B shows an example process 1050 for adjusting the optimized setpoint schedule, according to some embodiments. Examples and additional features relating to execution of process 1050 is shown below with respect to the examples of FIGS. 11-18. Various other logic for adjusting the setpoint schedule can be applied in various embodiments of FIG. 10A.

At step 1052, the optimized setpoint schedule is adjusted to start the system's ON hours with a discharge period of at least a threshold duration, if necessary (i.e., if such a discharge period is not already provided in the optimized setpoint schedule. The threshold duration may be two hours, for example. This adjustment can involve moving or shortening a charge period to make room for the discharge period.

At step 1054, a first charge period (following the initial discharge period as adjusted in step 1052) is adjusted as needed to have at least the threshold duration (e.g., two hours) and to have less than a maximum duration (e.g., six hours, seven hours). If the first charge period already has a duration in the desired range, the first charge period is not changed. If the first charge period is shorter than the threshold duration, the first charge period is extended, preferably by starting the first charge period earlier so that it still ends at the same time but has a longer duration. If the first charge period is longer than the maximum duration, the first charge period will be shortened, for example by equally moving time on both sides of the first charge period to neighboring discharge periods.

At step 1056, if a second discharge period (following the first charge period as adjusted in step 1054) is longer than a preset value (e.g., 7 hours), a second charge period is added at the end of the ON hours for the system. For example, the second charge period can be added for the last three hours of the ON hours for the system. In such examples, the ON hours for the system will end with a charge period.

Several variations and exceptions may be found, for example a fallback strategy used in scenarios where the example steps of process 1050 are not applicable. For example, as illustrated in FIG. 18 and describe below, if any charge or discharge period in the entire schedule has a duration larger than 7 hours or less than 1 hour, then a fallback injection schedule can be executed to provide the adjustment of the optimized schedule. Other specific examples will be made clear with reference to FIGS. 11-18 below.

Additionally, in the examples shown and for the adjusted setpoint schedule, the charge and discharge periods are converted to set-points based on the comfort band and the mode as part of step 1006. In cooling mode, the minimum comfort band temperature is throughout all charge periods and the maximum comfort band temperature is used throughout all discharge periods. In heating mode, the maximum comfort band temperature is used throughout all charge period and the minimum comfort band temperature is used throughout all discharge periods. Such setpoints adapt to time varying comfort bounds, such that the adjusted temperature schedule follows time varying comfort bounds, thereby accounting for occupant comfort.

Still referring to FIG. 10A, at step 1008, building equipment is operated in accordance with the adjusted setpoint schedule. For example, the adjusted setpoint schedule can be provided to a thermostat or other local controller for heating and/or cooling equipment and used to control the heating and/or cooling equipment to drive a measured value to the current setpoint provided in the adjusted setpoint schedule (e.g., using a feedback controller). The building can thus operate to drive actual building conditions towards the values shown in the adjusted setpoint schedule. Operating the building equipment can also include allow measured values to drift toward a current setpoint value shown by the adjusted setpoint schedule, e.g., to allow temperatures to increase after a pre-cooling segment or to decrease after a pre-heating segment, due to uncontrolled heat flows at the zone.

Step 1008 can also include collect various data relating to the building and operation of the building equipment over the time period. For example, the various data points discussed as being include in training data $Z^N$ above (e.g., indoor and outdoor temperatures, setpoint values, equipment settings, equipment power consumption values, etc.) can be collected during operation of the building equipment in accordance with the adjusted setpoint schedule. Because the adjusted setpoint schedule is configured to result in high quality training data, the data collected in step 1008 can be higher quality (e.g., capable of being used to generate more accurate predictive models) as compared to data collected without adjusting the setpoint schedule as described herein. Such training data can then be used as described in detail above to identify a system model and/or to update a previously-defined system model, which can then be used in model predictive control of the building equipment as described above.

Figure 11:
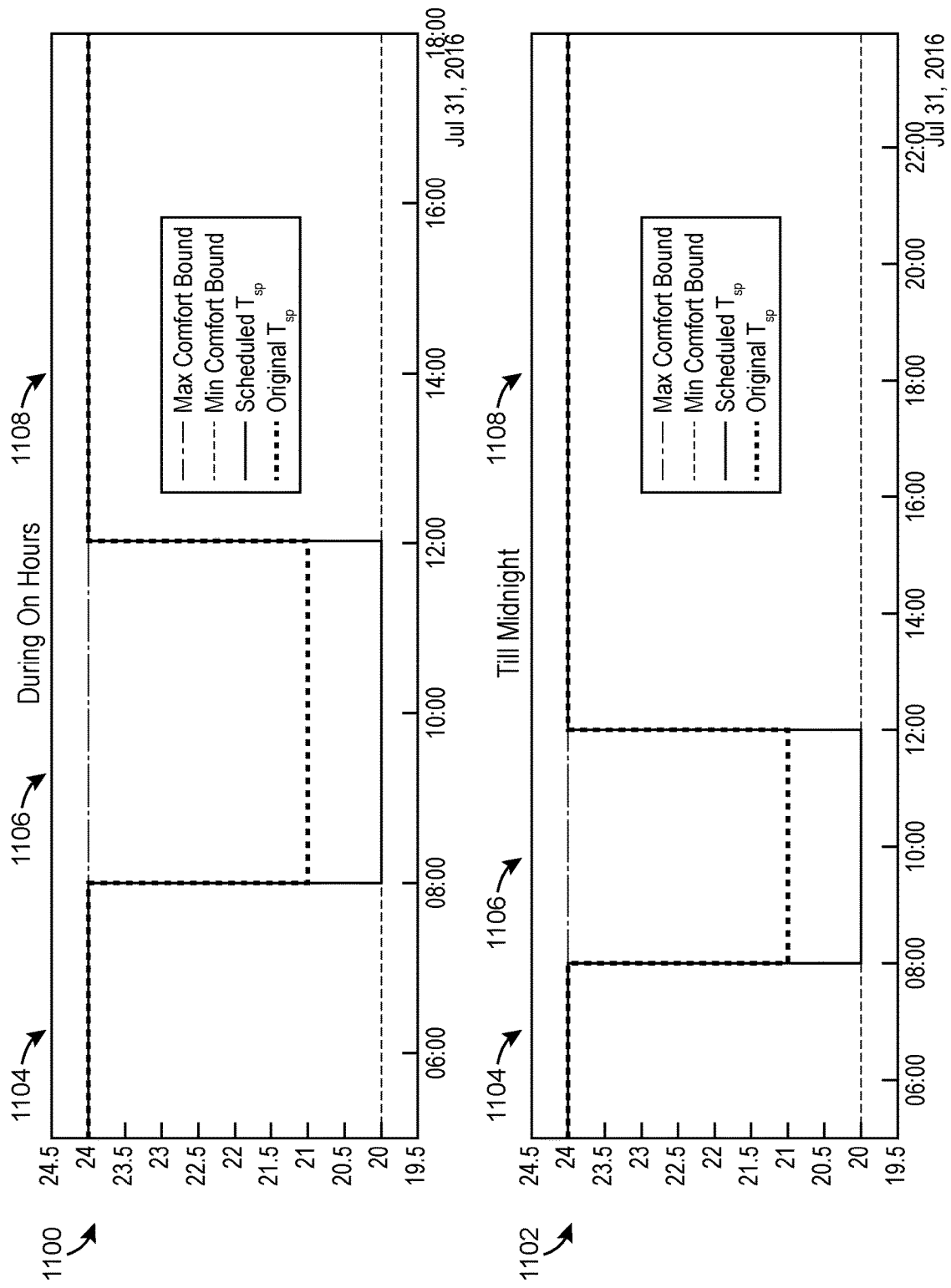
FIG. 11 is a graphical depiction of a first example adjustment of an optimized setpoint schedule as part of executing the experiment to generate high quality training data of FIG. 10A, according to some embodiments.

Referring now to FIG. 11, a graphical depiction of a first example of adjusting the optimized setpoint schedule at step 1006 of process 1000 is shown, according to some embodiments. FIG. 11 shows an on-hours graph 1100 and an on-and-after-hours graph 1102 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 11, the optimized setpoint schedule includes a first discharge period 1104 with a duration greater than two hours, a first charge period 1106 with a duration greater than two hours, and a third discharge period that lasts for six hours before the end of an ON period. According to the logic discussed above, the example of FIG. 11 is one in which the first charge period 1106 is already appropriately scheduled for generation of good training data. For example, the timing and duration of the first charge period 1106 can be considered as satisfying criteria for determining whether the first charge period 1106 needs to be adjusted. Accordingly, the timing and duration of the first charge period 1106 are not adjusted in the example of FIG. 11. However, to fully excite system dynamics without violating the comfort bounds, the optimized setpoint schedule is adjusted by lowering the setpoint during the first charge period 1106 to equal the minimum comfort bound. The equipment is then controlled using the adjusted setpoint schedule.

Figure 12:
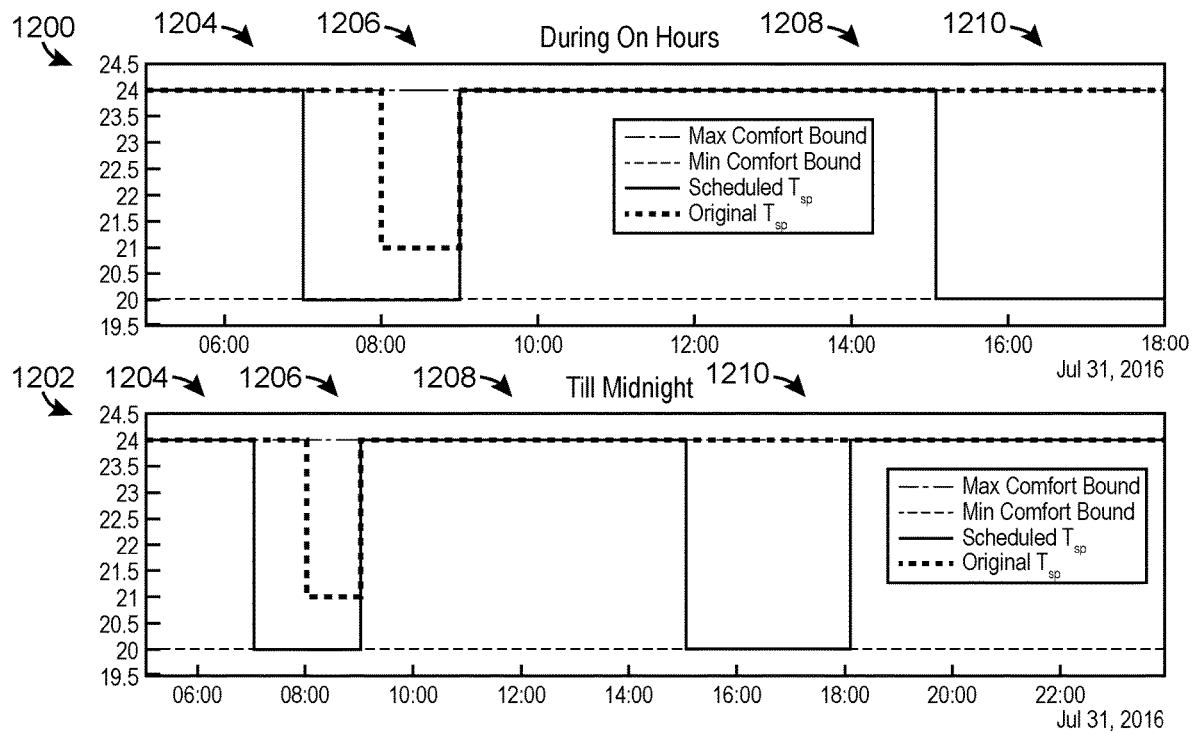
FIG. 12 is a graphical depiction of a second example adjustment of an optimized setpoint schedule as part of executing the experiment to generate high quality training data of FIG. 10A, according to some embodiments.

Referring now to FIG. 12, a graphical depiction of a second example of adjusting the optimized setpoint schedule at step 1006 of process 1000 is shown, according to some embodiments. FIG. 12 shows an on-hours graph 1200 and an on-and-after-hours graph 1202 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 12, the optimized setpoint schedule includes a first discharge period 1204 at the beginning of the ON period, a first charge period 1206 starting three hours after the beginning of the ON period and having a duration of one hour, and a second discharge period 1208 starting after the first charge period 1206 and extending until midnight. In this example, the first discharge period 1204 is sufficiently long, but the first charge period 1206 is too short (e.g., a duration of the first charge period 1206 is less than a threshold duration). As such, the first charge period 1206 is extended to start earlier and still end at the same time as the optimized first charge period 1206, in particular to start two hours after the beginning of the ON period for the building equipment.

Also in the example of FIG. 12, the second discharge period 1208 lasts seven hours or more, so the second discharge period 1208 is truncated to end three hours before the system turns off (off at 18:00 in the example of FIG. 12), and a second charge period 1210 is added in the adjusted setpoint schedule which starts after the second discharge and ends when the system turns off. Thus, in the example of FIG. 12, a second charge period 1210 is introduced as an adjustment of the optimized setpoint schedule. The adjusted setpoint schedule uses the minimize comfort bound to define the value of the setpoint in the first charge period 1206 and the second charge period 1208.

In the example of FIG. 12, the first charge period 1206 and the second charge period 1208 are expected to avoid (e.g., be scheduled to not coincide with) times of high energy costs or peak demand periods, which may typically occur in the middle of the day in the scenarios considered in this example. For example, by ending the first discharge period 1204 at the same time as in the optimized solution, the adjusted setpoint schedule preserves the avoidance of high energy prices considered to be achieved by the optimized setpoint schedule. The adjusted setpoint schedule can than thereby provide reduced energy costs as compared to other experimental implementations (e.g., randomized setpoint experiments).

Figure 13:
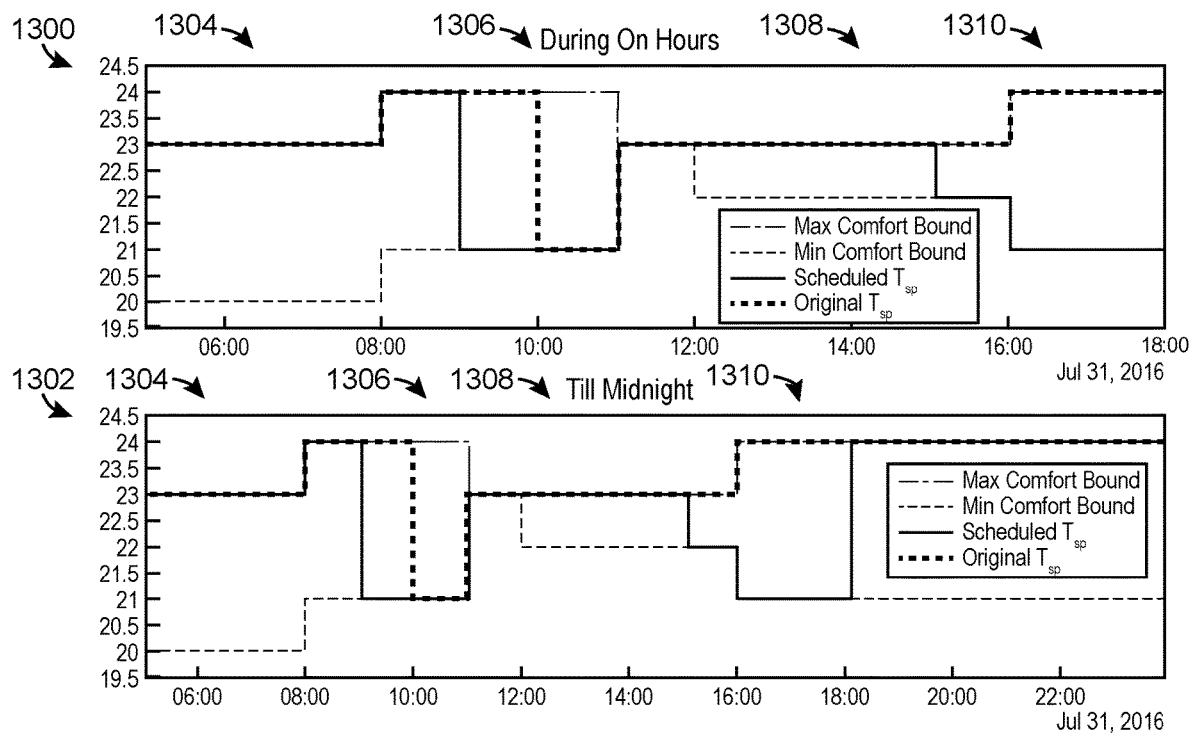
FIG. 13 is a graphical depiction of a third example adjustment of an optimized setpoint schedule as part of executing the experiment to generate high quality training data of FIG. 10A, according to some embodiments.

Referring now to FIG. 13, a graphical depiction of a third example of adjusting the optimized setpoint schedule at step 1006 of process 1000 is shown, according to some embodiments. FIG. 13 shows an on-hours graph 1300 and an on-and-after-hours graph 1302 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode. The example of FIG. 13 shows time-varying comfort constraints, where both the maximum comfort bound and the minimum comfort bound change over time.

In the example of FIG. 13, the optimized setpoint schedule includes a first discharge period 1304 at the beginning of the ON period, a first charge period 1306 starting four hours after the beginning of the ON period and having a duration of one hour, and a second discharge period 1208 starting after the first charge period 1206 and extending until midnight. In this example, the first discharge period 1304 is sufficiently long, but the first charge period 1306 is too short (e.g., a duration of the first charge period 1306 is less than a threshold duration such as two hours). As such, the first charge period 1306 is extended to start earlier and still end at the same time as the optimized first charge period 1206, in particular so that it has a duration of two hours. Also in the example of FIG. 13, the second discharge period 1308 lasts seven hours or more, so the second discharge period 1308 is truncated to end three hours before the system turns off (truncated to end at 15:00 in the example of FIG. 13), and a second charge period 1310 is added in the adjusted setpoint schedule which starts after the second discharge and ends when the system turns off. Thus, in the example of FIG. 13, a second charge period 1310 is introduced as an adjustment of the optimized setpoint schedule.

The example of FIG. 13 is thus similar to FIG. 12, but with time-varying comfort bounds. As shown, the adjust setpoint schedule assigns the minimum comfort bound as the setpoint during charge periods and the maximum setpoint bound as the setpoint during discharge periods (for the cooling mode example shown). As illustrated in FIG. 13, the setpoint changes during a charge or discharge period if the comfort bound changes during that period (e.g., at 16:00 in the example of FIG. 13). The adjusted setpoint schedule thereby adjusts for changing occupant preferences over time. The changing comfort bounds can be pre-defined or can be edited during the day by user input (e.g., user setpoint changes via a thermostat, etc.

Figure 14:
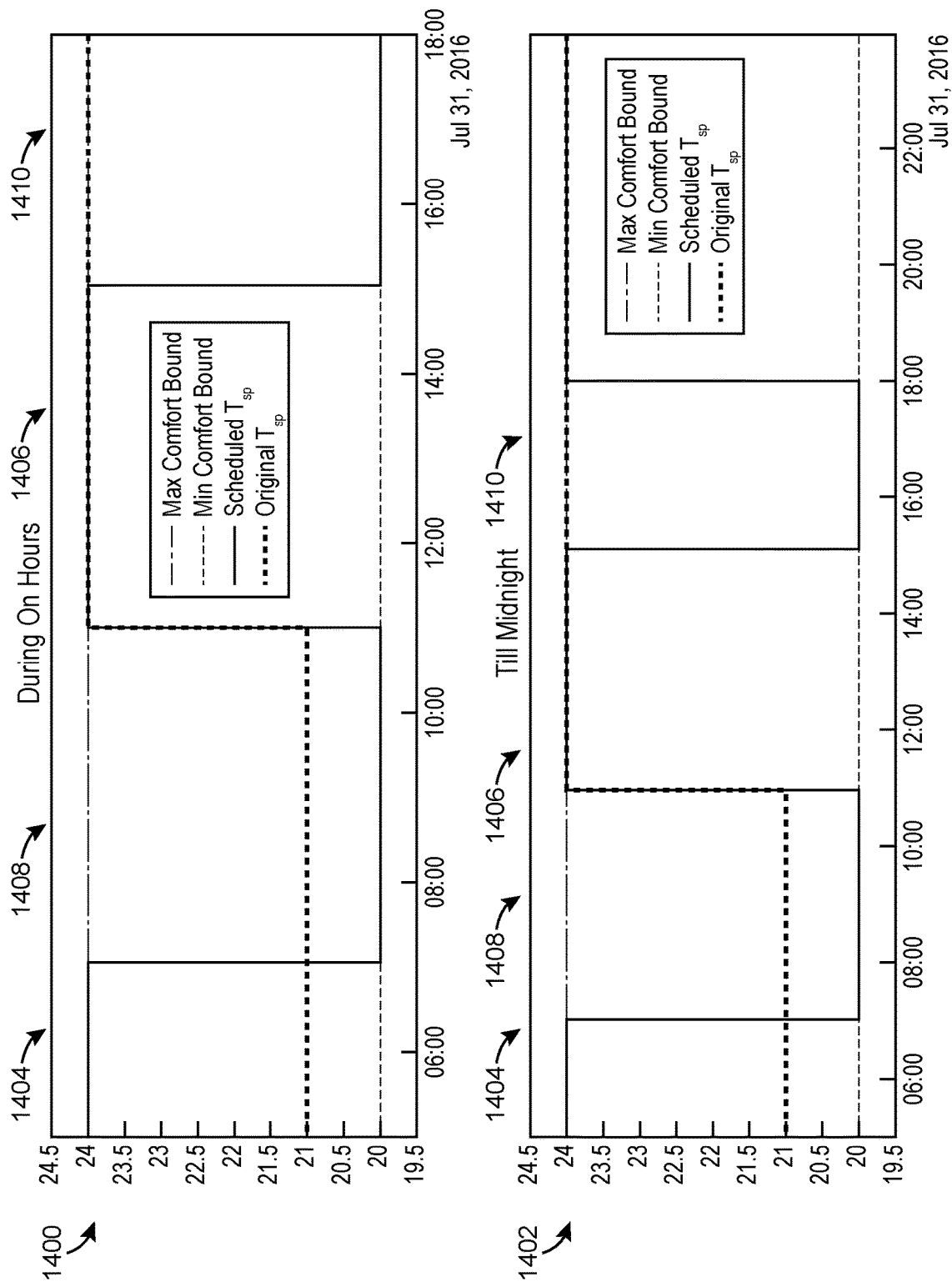
FIG. 14 is a graphical depiction of a fourth example adjustment of an optimized setpoint schedule as part of executing the experiment to generate high quality training data of FIG. 10A, according to some embodiments.

Referring now to FIG. 14, a graphical depiction of a fourth example of adjusting the optimized setpoint schedule at step 1006 of process 1000 is shown, according to some embodiments. FIG. 14 shows an on-hours graph 1400 and an on-and-after-hours graph 1402 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 14, the optimized setpoint schedule starts with a charge period 1404, followed by a discharge period 1406 starting at 11:00 and extending until midnight (including for nine hours before the system goes off at 18:00. As such, the example optimized schedule of FIG. 14 is determined as not starting with a sufficient discharge period, and the optimized setpoint schedule is adjusted to add an initial discharge period 1408 starting when the system turns on and having a duration of two hours before starting the truncated charge period 1404. Additionally, because the discharge period 1406 had a duration of seven hours or greater, an additional charge period 1410 is added which extends for the final three hours of the system's ON period. As in other examples, the optimized setpoint schedule is also adjusted so that the value for the setpoint is equal to the minimum comfort bound during charge periods.

Figure 15:
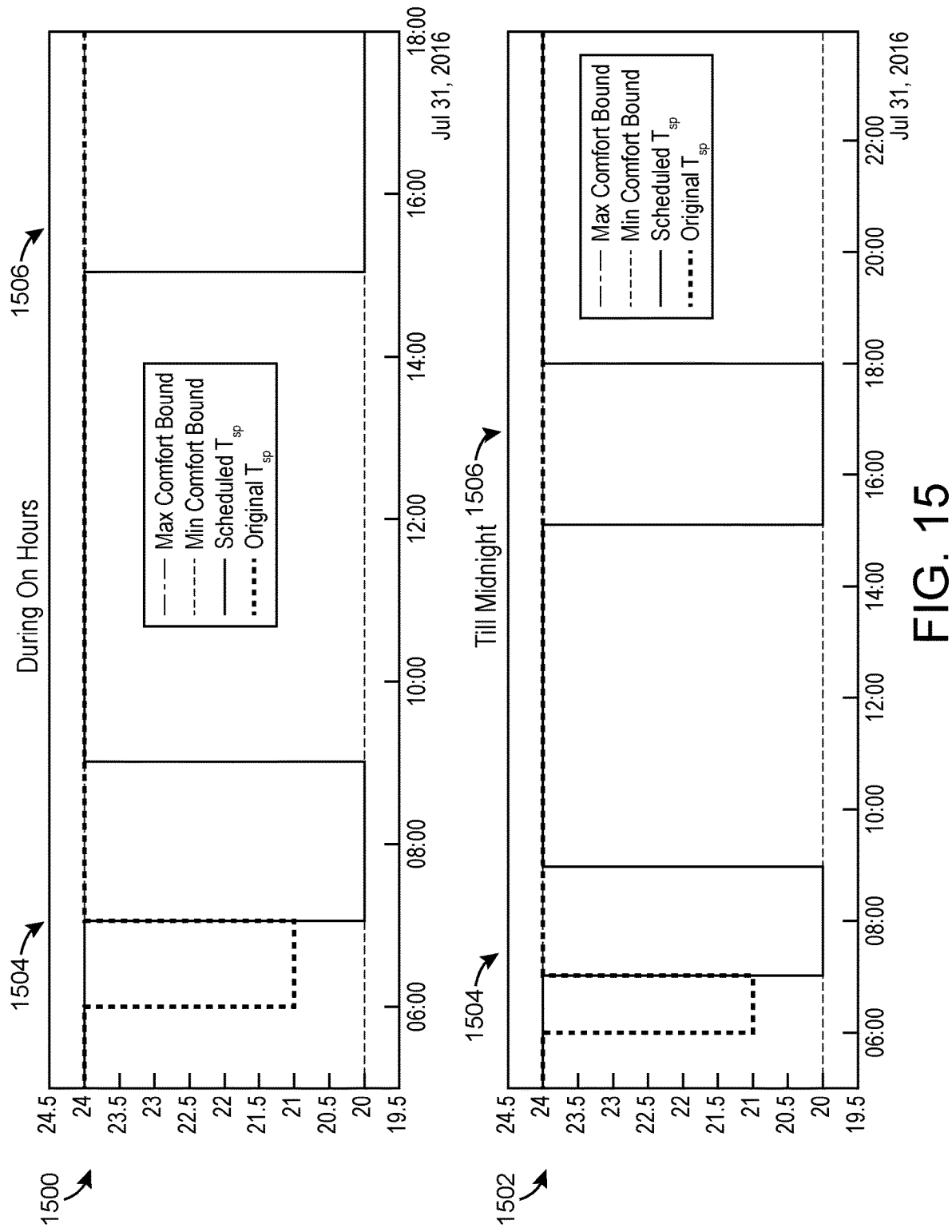
FIG. 15 is a graphical depiction of a fifth example adjustment of an optimized setpoint schedule as part of executing the experiment to generate high quality training data of FIG. 10A, according to some embodiments.

Referring now to FIG. 15, a graphical depiction of a fifth example of adjusting the optimized setpoint schedule at step 1006 of process 1000 is shown, according to some embodiments. FIG. 15 shows an on-hours graph 1500 and an on-and-after-hours graph 1502 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 15, the optimized setpoint schedule includes a charge period 1504 that occurs one hour after the system turns on and has a duration of one hour. To obtain the adjusted setpoint schedule and achieve a sufficient discharge at the beginning of the ON period, the charge period 1504 is delayed to start two hours after the system turns on. The charge period 1504 is also extended to last for a threshold duration (shown as two hours). Additionally, as in other examples discussed above, a second charge period 1506 is added for the final hours of the system's ON hours for the day.

Figure 16:
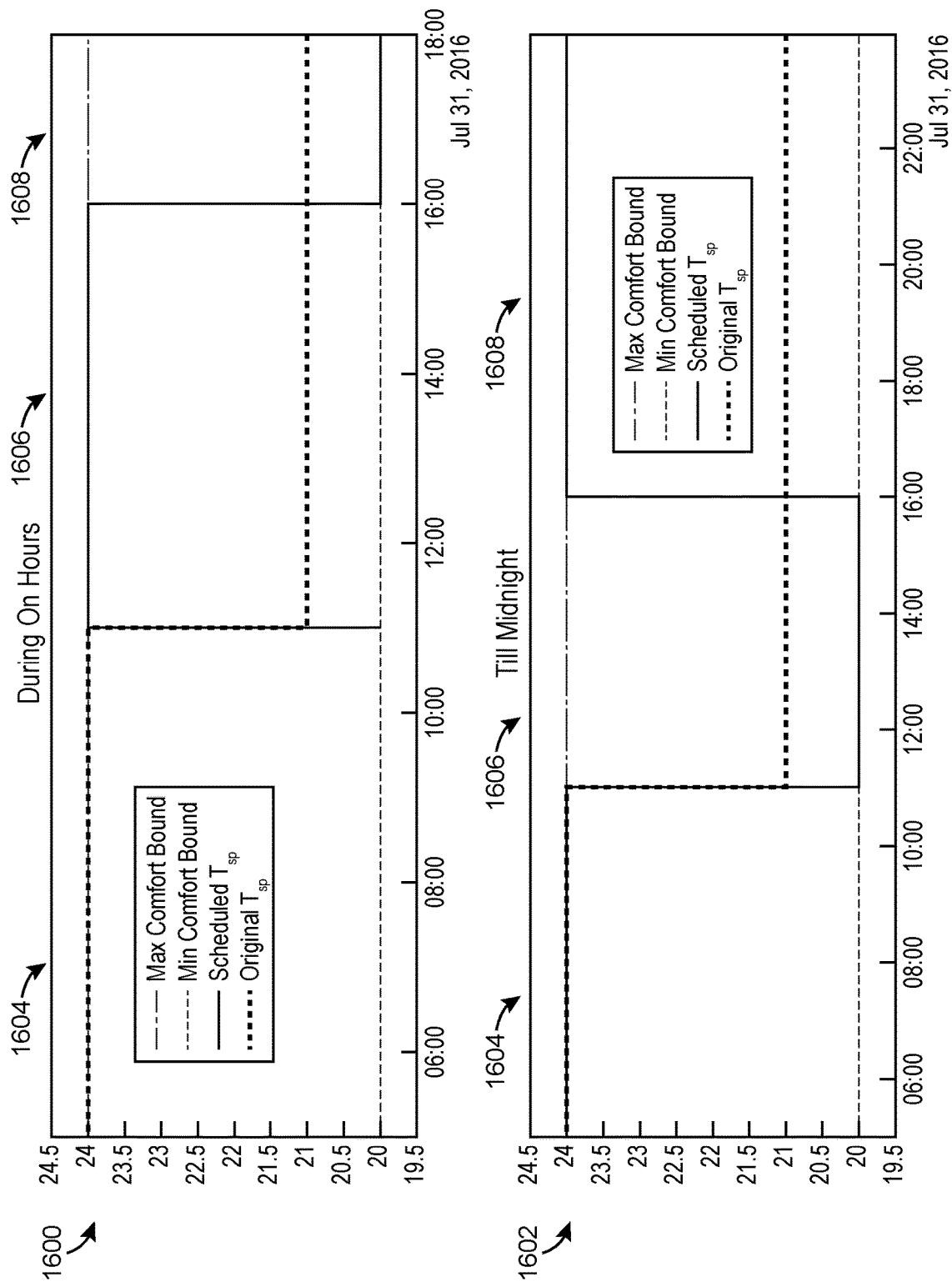
FIG. 16 is a graphical depiction of a sixth example adjustment of an optimized setpoint schedule as part of executing the experiment to generate high quality training data of FIG. 10A, according to some embodiments.

Referring now to FIG. 16, a graphical depiction of a sixth example of adjusting the optimized setpoint schedule at step 1006 of process 1000 is shown, according to some embodiments. FIG. 16 shows an on-hours graph 1600 and an on-and-after-hours graph 1602 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 16, the optimized setpoint schedule includes a six hour discharge period 1604 followed by a charge period 1606 that extends until midnight. The optimized setpoint schedule is first adjusted so that the charge period 1606 ends at least two hours before the system turns off. That is, FIG. 16 shows an example where the timing of the charge period 1606 violates a criterion relating to the charge period ending at least a threshold amount of time before the system turns off and the charge period 1606 is adjust so that it satisfies the criterion. A terminal discharge period 1608 is then scheduled from the adjusted end of the charge period 1606 to an end of the schedule.

Figure 17:
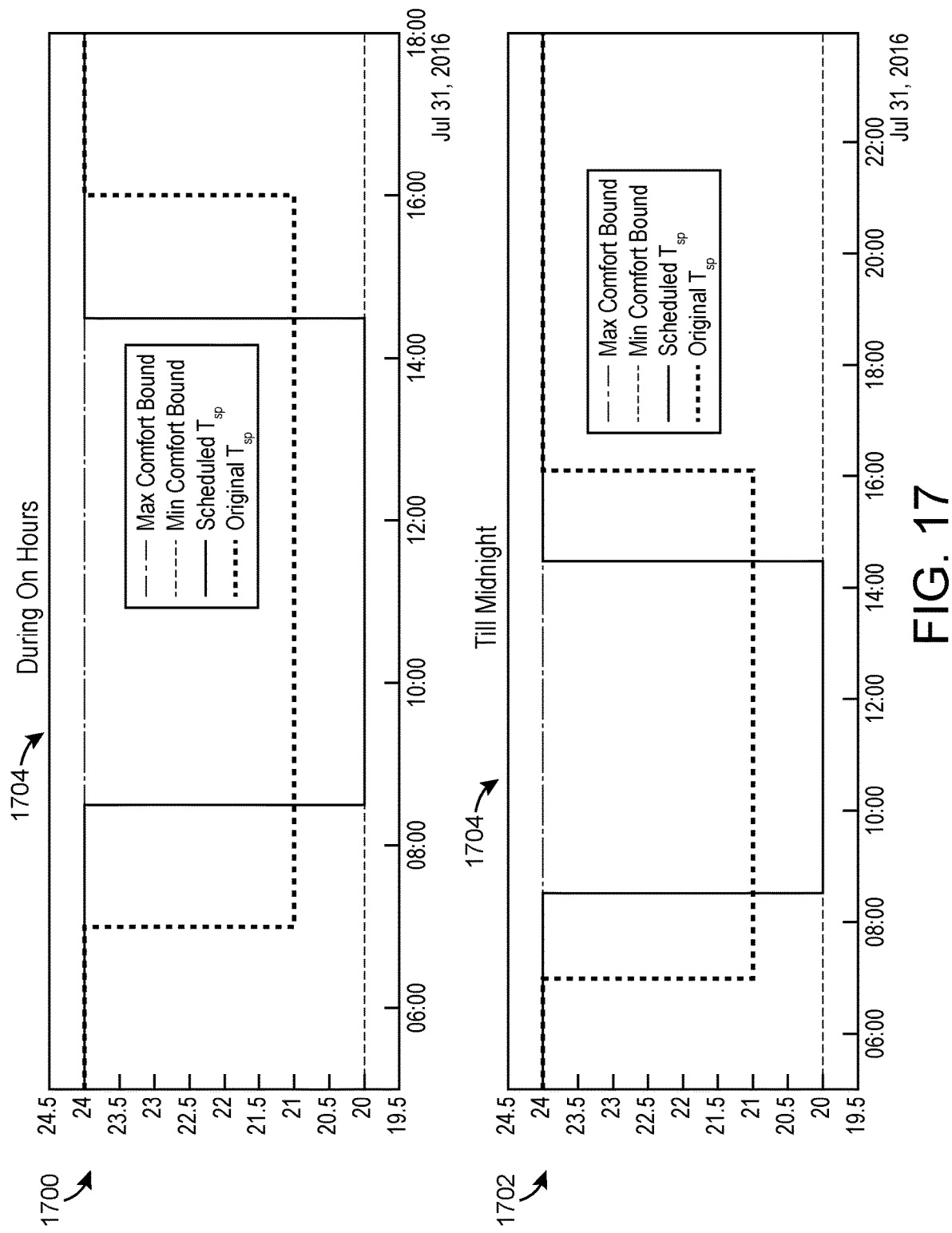
FIG. 17 is a graphical depiction of a seventh example adjustment of an optimized setpoint schedule as part of executing the experiment to generate high quality training data of FIG. 10A, according to some embodiments.
Figure 18:
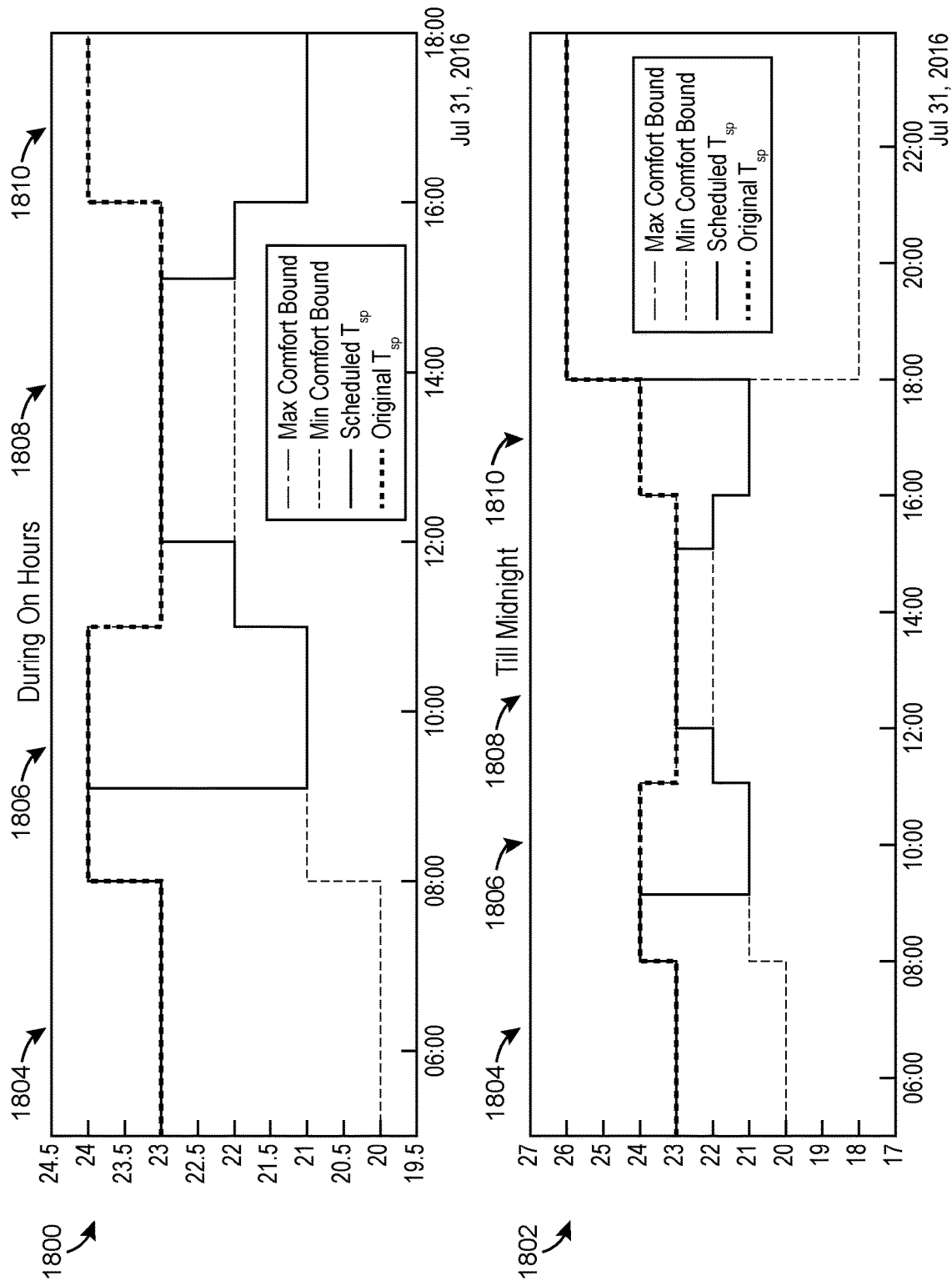
FIG. 18 is a graphical depiction of an eighth example adjustment of an optimized setpoint schedule as part of executing the experiment to generate high quality training data of FIG. 10A, according to some embodiments.

Referring now to FIG. 17, a graphical depiction of a seventh example of adjusting the optimized setpoint schedule at step 1006 of process 1000 is shown, according to some embodiments. FIG. 17 shows an on-hours graph 1700 and an on-and-after-hours graph 1702 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 17, the optimized setpoint schedule includes a charge period 1704 that lasts longer than six hours (shown as nine hours), such that the charge period 1706 is longer than a threshold duration (six hours in the example shown). In response, the charge period 1704 is shortened to have a duration of six hours. The three hours removed from the charge period 1704 are equally distributed to discharge periods before and after the charge period 1704.

Referring now to FIG. 18, a graphical depiction of antth example of adjusting the optimized setpoint schedule at step 1006 of process 1000 is shown, according to some embodiments. FIG. 18 shows an on-hours graph 1800 and an on-and-after-hours graph 1802 for the same day, with lines plotted thereon representing a maximum comfort bound (i.e., a maximum acceptable temperature), a minimum comfort bound (i.e., a minimum acceptable temperature), an optimized setpoint schedule (shown as "original $T_{sp}$"), and an adjusted setpoint schedule (shown as "scheduled $T_{sp}$"). The example is shown for a cooling mode.

In the example of FIG. 18, the optimized setpoint schedule does not include any charge periods, as the setpoint is shown as tracking the maximum comfort bound for the entire day. As such, there are no charge periods to be modified or adjusted in step 1006, and a fallback injection strategy is executed instead (i.e., in response to a determination that there are no charge periods or that a discharge period is greater than a threshold duration). In various embodiments, the fallback injection strategy may be as follows: If the equipment ON hours are less than 12 hours, the fallback injection strategy includes scheduling a discharge for 35% of the ON hours followed a charge for 30% of the ON hours followed a discharge for the remaining 35% of the ON hours of the day. If the HVAC equipment ON hours are more than 12 hours, the fallback injection strategy consists of a discharge for 30% of the ON hours followed a charge for 20% of the ON hours followed a discharge for 30% of the ON hours followed by a charge for the remaining 20% of the ON hours of the day. A final discharge period is scheduled after the end of the ON hours until midnight if such OFF hours exist.

In the example of FIG. 18, the total ON hours are greater than 12 hours (shown as 13 hours). As such, a first discharge period 1804 is scheduled for the first 30% of the ON hours, followed by a first charge period 1806 for 20% of the ON hours, followed by a second discharge period 1808 for the next 30% of the ON hours, followed by a second charge period 1810 for the next 20% of the ON hours, in accordance with the logic described above. Such an adjustment has been experimentally shown to provide better quality training data resulting more accurate predictive models as compared to other types of setpoint variations.

FIGS. 11-18 thereby illustrate various examples of adjusting optimized setpoint schedules as in step 1006 of process 1000 of FIG. 10A. It should be understood that these examples are included to show various scenarios, but are not exhaustive of the scenarios that can be handled by process 1000.

Figure 19:
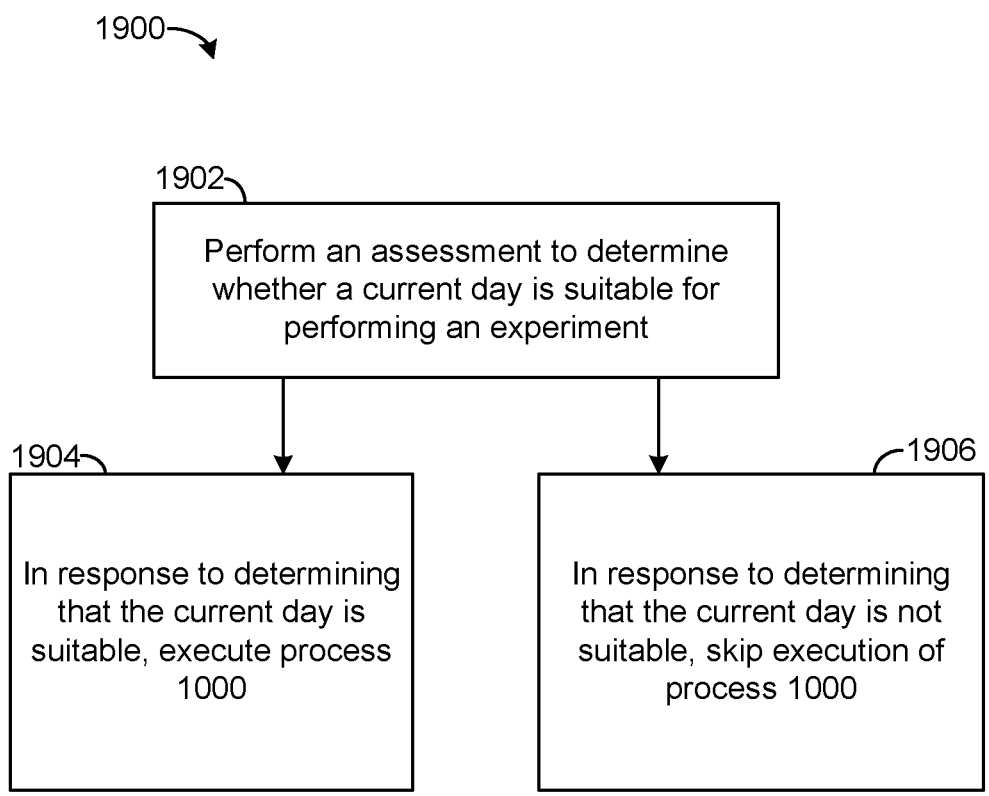
FIG. 19 is a flowchart of a process for determining whether to execute the process of FIG. 10A for a current day, according to some embodiments.

Referring now to FIG. 19, a flowchart of a process 1900 for determining whether to execute process 1000 is shown, according to some embodiments. The process 1900 can be executed by the controller 212, for example by the training data generator 408 of the processing circuit 400 of controller 212 shown in FIG. 2, for example. Process 1900 beneficially avoids over-scheduling of system identification experiments via process 1000 (which can drive up costs, discomfort, equipment degradation, etc.), for example by limiting experiments to days expected to result in quality data.

At step 1902, an assessment is performed to determine whether a current day is suitable for performing an experiment, for example suitable for generating quality data. In some embodiments, the assessment includes determine whether today is expected to be a low loads day, for example following the process shown in FIG. 20 and described in detail with reference thereto. In such embodiments, the current day is not suitable for generation of quality data if it is expected to be a low loads day.

In some embodiments, the assessment includes determining whether an injection was made yesterday (i.e., whether process 1000 was executed to generate an adjusted setpoint schedule for the preceding day). If so, data collection during the preceding day is passed through a data quality assessment (e.g., data selection algorithm) such as that shown in FIG. 9 and described in detail above. If the data fails the quality assessment (e.g., if insufficient quality data was collected yesterday), then a determination is made that the current day is not suitable for generation of quality data. If the data passes the quality assessment (e.g., sufficient quality data was collected) then a determination is made that the current day is suitable for generation of quality data.

In some embodiments, assessment includes tracking a number of injections over a preceding time period and determining whether the number of injections exceeds a threshold. For example, a variable can be stored and updated that tracks the number of injection days over the past week (seven days), and step 1902 can include determining that the current is not suitable for an experiment (injection) if more than three days (or some other threshold in various embodiments) over the past week are injection days. As another example, a variable can be stored and updated that tracks the number of injection days within the past two weeks, and step 1902 can include determining that the current is not suitable for an experiment (injection) if more than six days (or some other threshold in various embodiments) over the past two weeks are injection days.

If the current day is determined to be suitable for an experiment in step 1902, process 1900 proceeds to step 1904 where process 1000 is executed in response to the determination that the current day is suitable. If the current day is determined not to be suitable for an experiment in step 1902, process 1900 proceeds to step 1906 where process 100 is skipped for the current day in response to the determination that the current day is not suitable. Under step 1906, the optimized setpoint schedule is used to control building equipment without adjustment under process 1000, thereby avoiding energy, cost, and computational inefficiencies associated with executing process 1000 on unsuitable days.

Process 1900 can be executed at the beginning of every day (e.g., one hour before the system turns on for the day, at midnight, etc.).

Figure 20:
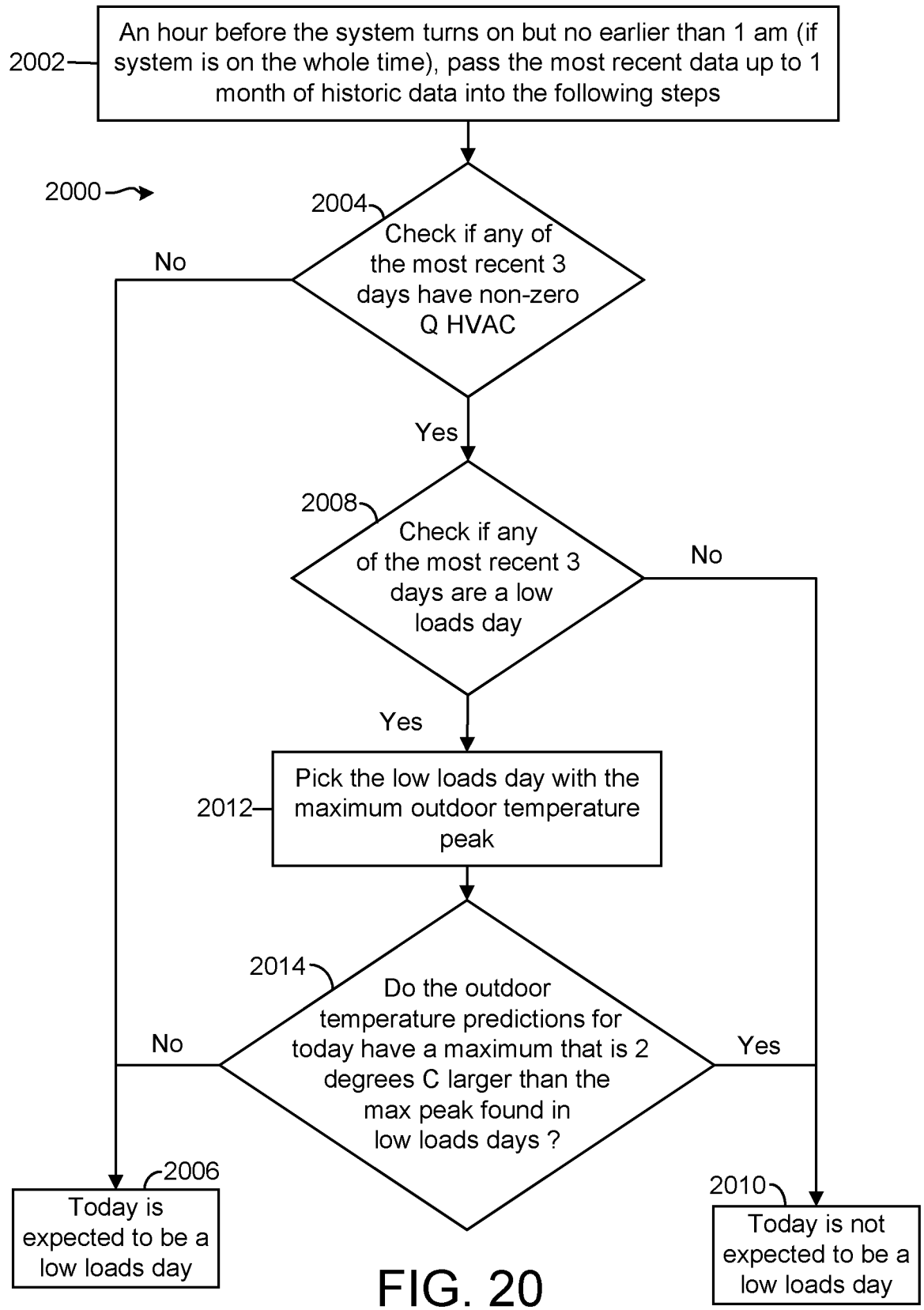
FIG. 20 is a flowchart of a process for determining whether a current day is expected to be a low loads day, according to some embodiments.

Referring now to FIG. 20, a flowchart of a process 2000 for predicting whether a current day is expected to be a low loads day is shown, according to some embodiments. Process 2000 can be executed in step 1902 of process 1900 of FIG. 19, for example. Process 2000 can be executed by the controller 212, for example by the training data generator 408 of the processing circuit 400 of controller 212 shown in FIG. 2, for example. Process 2000 can help to avoid executing process 1000 on days expected to not create conditions suitable for generating quality training data.

At step 2002, an hour before the system turns on but no earlier than 1:00 am (if the system is on the whole time, the most recent data (e.g., one month of historic data, three days of data, etc.) is passed into the following steps of process 2000. Process 2000 can thus be executed at the beginning of every day using the most recent data from the proceeding days.

At step 2004, the most recent three days are checked to determine whether any of the most recent three days have non-zero values of $Q_{HVAC}$, i.e., heat provided or removed from a building zone by operation of heating, ventilation, and/or cooling (HVAC) equipment. A non-zero value of $Q_{HVAC}$ indicates that the HVAC equipment operated to heat or cool a space during the day, such that the given day required load on the building equipment. A zero value of $Q_{HVAC}$ indicates that operation of building equipment was not required to heat or cool a space during a given day, for example because outdoor air temperature sufficiently matched the desired indoor air temperature so that no heating or cooling was needed. Values of $Q_{HVAC}$ can be included in the historic data obtained at step 2002 and compared to zero in step 2004.

If none of the three most recent days have non-zero $Q_{HVAC}$ (i.e., heating or cooling was not required for all of the three preceding days) ("No" at step 2004), process 2000 proceeds to step 2006 where a determination is finalized that today is expected to be a low loads day. Because the three preceding days were zero load days, it can be expected that today will typically be a zero or low-loads day. The determination can be passed into step 1902 of process 1900.

If any (i.e., one or more) of the three most recent days have non-zero $Q_{HVAC}$ (i.e., heating or cooling was not required for at least one of the three preceding days), process 2000 proceeds to step 2008 where a determination is made as to whether any of the three preceding days with non-zero $Q_{HVAC}$ is a low loads day. A low loads day is a day where $Q_{HVAC}$ is less than a threshold value. In some embodiments, the threshold value is determined as a percentage (e.g., 5%, 10%, of a maximum one-day $Q_{HVAC}$ determined for the building in historical data.

If none of the preceding three days are low loads days ("No" at step 2008), process 2000 proceeds to step 2010 where a determination is finalized that today is not expected to be a low loads day. Because the preceding three days had more than a threshold load (i.e., required more than a threshold amount of heating or cooling), it can be expected that today will typically also not be a low loads day.

If one or more of the preceding three days is a low load day ("Yes" at step 2008), process 2000 proceeds to step 2012 where the low load day with the maximum outdoor temperature peak is picked (in scenarios where multiple preceding days are low load days), assuming a cooling mode. In a heating mode, the low load day with the minimum outdoor temperature extremum is picked. Logic for both cooling heating modes can be executed in parallel at steps 2012-2014 in some embodiments, with the example of FIG. 12 showing a cooling scenario. Thus, the peak temperature which still provided low loads is determined in step 2014.

At step 2014, for a cooling mode, a determination is made as to whether the outdoor temperature predictions for today (e.g., from a third party weather forecasting service) have a maximum that is two degrees Celsius (or some other threshold value) greater than maximum peak found in the low load days at step 2012. That is, step 2014 can include determining whether a weather forecast predicts that today will be more than a threshold amount hotter than the hottest recent low loads day (in a cooling mode). For a system in a heating mode, step 2014 can include determining whether a weather forecast predicts that today will be more than a threshold amount colder than the coldest recent low loads day.

In response to a determination that today's temperature will be within the threshold as assessed in step 2014 ("No" at step 2014), a determination is made that today is expected to be a low loads day at step 206. Because today will have similar temperature conditions that results in a low loads day, today can be expected to also be a low loads day. The determination can be passed into process 1900.

In response to a determination that today's temperature will be outside the threshold as assess in step 2014 ("Yes" at step 2014), a determination is mad that today is not expected to be a low loads day (step 2010). Because outside temperature conditions are dissimilar from days with low load conditions, today can be expected to require substantial heating or cooling and can thus be expected to not be a low loads day. The determination can be passed into process 1900.

The process 2000 thereby provides a process for assessing whether today will be a low loads day, for example for use in determining whether to run a system identification experiment today. Because system dynamics will not be sufficiently excited on a low loads day, process 1900 can contribute to an automated determination to not run a system identification experiment on a given day and, conversely, to ensure that days for which an experiment is run are expected to provide suitable conditions for obtaining quality data.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

Although specific numbers of hours are provided for ease of explanation, it should be noted that the specific numbers of hours are not required and could be changed in various embodiments without departing from the teachings provided herein. Accordingly, any specific number of hours described herein should be interpreted as one example of a threshold number of hours and should not be regarded as limiting.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A method of operating building equipment, comprising:
obtaining an optimized setpoint schedule for a time period;
identifying a pre-cooling or pre-heating segment of the optimized setpoint schedule based on at least one setpoint change in the optimized setpoint schedule;
obtaining an adjusted setpoint schedule by:
performing an evaluation of a characteristic of the pre-cooling or pre-heating segment of the optimized setpoint schedule; and
adjusting the optimized setpoint schedule based on the evaluation; and
operating the building equipment in accordance with the adjusted optimized setpoint schedule by controlling the building equipment to drive a measured value toward a setpoint in the adjusted setpoint schedule.

2. The method of claim 1, further comprising:
collecting data relating to the building while operating the building equipment in accordance with the adjusted optimized setpoint schedule; and
generating a system model based on the data collected while operating the building equipment in accordance with the adjusted optimized setpoint schedule.

3. The method of claim 2, wherein the adjusting the optimized setpoint schedule causes an improvement in a quality of the data collected while operating the building equipment in accordance with the adjusted optimized setpoint schedule relative to operating the building equipment in accordance with the optimized setpoint schedule.

4. The method of claim 1, further comprising:
obtaining a comfort threshold for a space served by the building equipment, the comfort threshold defining at least one of a minimum comfortable value for the space or a maximum comfortable value for the space; and setting one or more setpoints of the adjusted optimized setpoint schedule to the minimum comfortable value for the space or the maximum comfortable value for the space.

5. The method of claim 4, wherein obtaining the comfort threshold comprises generating the comfort threshold using a neural network.

6. The method of claim 1, wherein:
obtaining the optimized setpoint schedule comprises performing an optimization configured to provide the optimized setpoint schedule with the pre-cooling or pre-heating segment;
the characteristic is a duration of the pre-cooling or pre-heating segment, the duration determined based on the at least one setpoint change in the optimized setpoint schedule; and
adjusting the optimized setpoint schedule comprises determining whether the duration is less than a threshold value and extending the pre-cooling or pre-heating segment if the duration is less than the threshold value.

7. The method of claim 6, wherein the extending the pre-cooling or pre-heating segment comprises starting the pre-cooling or pre-heating segment at an earlier time in the time period while maintaining an end time of the pre-cooling or pre-heating segment.

8. The method of claim 1, further comprising obtaining a limit on a variable represented in the optimized setpoint schedule and the adjusted setpoint schedule; and
wherein adjusting the optimized setpoint schedule comprises moving setpoints for the variable in the pre-cooling or pre-heating segment to the limit.

9. The method of claim 1, wherein adjusting the optimized setpoint schedule comprising injecting an additional pre-cooling or pre-heating segment.

10. The method of claim 1, further comprising:
collecting data while operating the building equipment;
performing a quality assessment of the data; and
in response to the data failing the quality assessment, skipping the adjusting the optimized setpoint schedule for a subsequent time period.

11. The method of claim 1, wherein the characteristic is a duration of the pre-cooling or pre-heating segment or a total count of one or more charge periods comprising the pre-cooling or pre-heating segment.

12. A building control system comprising circuitry configured to:
obtain an optimized setpoint schedule for a time period;
identify a pre-cooling or pre-heating segment of the optimized setpoint schedule based on at least one setpoint change in the optimized setpoint schedule;
obtain an adjusted setpoint schedule by:
performing an evaluation of a characteristic of the pre-cooling or pre-heating segment, wherein the characteristic relates to the least one setpoint change in the optimized setpoint schedule; and
adjusting the optimized setpoint schedule based on the evaluation;
operate building equipment in accordance with the adjusted optimized setpoint schedule by controlling the building equipment to drive a measured value toward a setpoint in the adjusted setpoint schedule.

13. The building control system of claim 12, wherein the circuitry is further configured to:
collect data relating to the building while operating the building equipment in accordance with the adjusted optimized setpoint schedule; and
generate a system model based on the data collected while operating the building equipment in accordance with the adjusted optimized setpoint schedule.

14. The building control system of claim 13, wherein the adjusting the optimized setpoint schedule causes an improvement in a quality of the data collected while operating the building equipment in accordance with the adjusted setpoint schedule relative to operating the building equipment in accordance with the optimized setpoint schedule.

15. The building control system of claim 12, wherein the circuitry is further configured to:
obtain a comfort threshold for a space served by the building equipment; and
prevent the adjusted optimized setpoint schedule from violating the comfort threshold.

16. The building control system of claim 15, wherein the circuitry is configured to obtain the comfort threshold by generating the comfort threshold using a neural network.

17. The building control system of claim 12, wherein:
the characteristic is a duration of the pre-cooling or pre-heating segment; and
the circuitry is configured to adjust the optimized setpoint schedule by extending the pre-cooling or pre-heating segment if the duration is less than a threshold value.

18. The building control system of claim 17, wherein the extending the pre-cooling or pre-heating segment comprises starting the pre-cooling or pre-heating segment at an earlier time in the time period while maintaining an end time of the pre-cooling or pre-heating segment.

19. The building control system of claim 12, wherein the circuitry is further configured to obtain a limit on a variable represented in the optimized setpoint schedule and the adjusted setpoint schedule, and wherein the circuitry is configured to adjust the optimized setpoint schedule by moving values of the variable for the pre-cooling or pre-heating segment to the limit.

20. The building control system of claim 12, wherein the circuitry is configured to adjust the optimized setpoint schedule by injecting an additional pre-cooling or pre-heating segment.

21. The building control system of claim 12, wherein the circuitry is further configured to:
collect data while operating the building equipment;
perform a quality assessment of the data; and
in response to the data failing the quality assessment, skip an adjustment of the optimized setpoint schedule for a subsequent time period.

22. The building control system of claim 12, wherein the characteristic comprises a duration of the pre-cooling or pre-heating segment or a total count of one or more charge periods comprising the pre-cooling or pre-heating segment.

23. A method of operating building equipment, comprising:
obtaining a setpoint schedule for a time period;
increasing system excitation represented in data created by operating the building equipment over the time period by injecting an additional setpoint change into the setpoint schedule based on a characteristic relating to an existing setpoint change in the setpoint schedule, wherein injecting the additional setpoint change causes an increase in the system excitation;
operating the building equipment based on the setpoint schedule and the additional setpoint change.

24. The method of claim 23, wherein the obtaining the setpoint schedule for the time period comprises performing a predictive optimization configured to output the setpoint schedule.

* * * * *